United States Patent [19]

Notaras et al.

[11] Patent Number: 4,911,126
[45] Date of Patent: Mar. 27, 1990

[54] TRANSISTOR IGNITION CIRCUIT

[76] Inventors: John A. Notaras; Angelo L. Notaras, both of 15 Reynolds Street, Balmain, Australia, 2041

[21] Appl. No.: 147,116

[22] Filed: Jan. 21, 1988

Related U.S. Application Data

[63] Continuation-in-part of Ser. No. 45,804, Apr. 24, 1987, abandoned, which is a continuation of Ser. No. 800,613, Nov. 21, 1985, abandoned.

[30] Foreign Application Priority Data

Nov. 22, 1984 [AU] Australia .............................. PG8247
Mar. 13, 1985 [AU] Australia .............................. PG9696

[51] Int. Cl.⁴ .............................................. F02P 1/08
[52] U.S. Cl. .................................... 123/418; 123/335; 123/424
[58] Field of Search ............... 123/637, 636, 651, 655, 123/149 R, 149 A, 149 C, 149 D, 418, 424, 335, 630

[56] References Cited

U.S. PATENT DOCUMENTS

| | | | |
|---|---|---|---|
| 3,866,589 | 2/1975 | Haubner et al. | 123/418 |
| 3,878,824 | 4/1975 | Haubner et al. | 123/148 E |
| 3,938,491 | 2/1976 | Mazza | 123/149 C |
| 3,958,546 | 5/1976 | Ohki et al. | 123/148 E |
| 3,963,015 | 6/1976 | Haubner et al. | 123/651 |
| 4,090,488 | 5/1978 | Ohki et al. | 123/148 E |
| 4,144,854 | 3/1979 | Katada et al. | 123/418 |
| 4,163,437 | 8/1979 | Notaras et al. | 123/149 C |
| 4,188,929 | 2/1980 | Podrapsky et al. | 123/651 |
| 4,342,304 | 8/1982 | Tanabe | 123/599 |

FOREIGN PATENT DOCUMENTS

1016991 9/1977 Canada .
1155939 6/1969 United Kingdom .

*Primary Examiner*—Andrew M. Dolinar
*Attorney, Agent, or Firm*—Hugh D. Jaeger

[57] ABSTRACT

The present invention discloses a multiple spark transistor ignition circuit which is able to provide negligible retardation of ignition time, and/or prevent ignition with reverse rotation and/or provide an additional advanced spark and/or govern maximum engine speed and/or progessively advance the moment of ignition with increasing engine speed. The basic circuit comprises an ignition circuit of the type disclosed in U.S. Pat. No. 4,163,437 (Notaras) with a diode interposed between the primary winding and the remainder of the circuit. Circuits having a single primary winding and dual remainders or dual primary windings and single remainders are also disclosed. A governor circuit having a control transistor, a further potential divider and a control capacitor, is also disclosed.

12 Claims, 16 Drawing Sheets

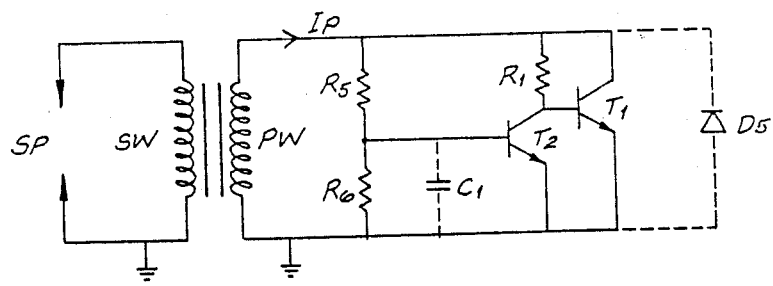
PRIOR ART  FIG. 1
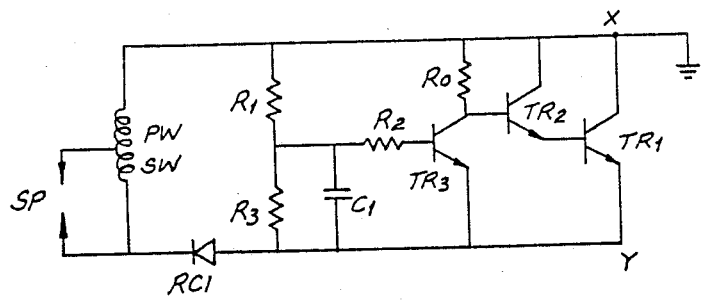
PRIOR ART  FIG. 2
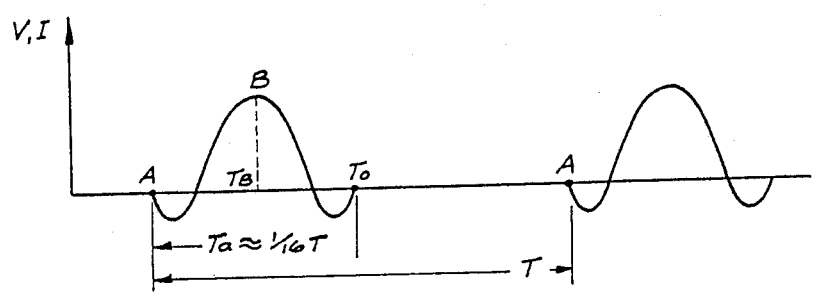
PRIOR ART  FIG. 3

TRANSISTOR IGNITION CIRCUIT

This is a continuation in part of co-pending application Ser. No. 045,804 filed on Apr. 24, 1987, which is a continuation on of application Ser. No. 800,613 filed on Nov. 21, 1985, which was co-pending therewith but is now abandoned.

The present invention relates to transistor magneto ignition circuits which permit multiple sparks at the moment of ignition. In particular, the invention relates to improved multiple spark transistor ignition circuits which exhibit one or more of the following characteristics:

(1) negligible retardation of the time of ignition with increasing engine revolutions;
(2) an ability to prevent ignition in the event of reverse rotation of the engine;
(3) an additional advanced spark (or a plurality of sparks) at high engine speeds;
(4) a maximum engine speed governor; and
(5) the ignition timing advances with increasing engine speed for some magneto geometries.

The present invention arises as a result of development work carried out on the basic transistor circuit disclosed in U.S. Pat. No. 4,163,437 (Notaras) granted to the present applicants. In particular, it was noted that although the highly desirable feature of a plurality of sparks at the moment of ignition was achieved, with some magneto yoke and rotor geometries, the transistor ignition circuits disclosed in that Patent specification tend to have the characteristic that with increasing speed and high engine revolutions, there is an increasing retardation of the time of ignition.

In addition, many transistor ignition circuits can suffer from the disadvantage that there is sufficient magneto operation in the event that should the rotor of the engine be rotated backwards, for the ignition circuit to create a spark at low engine rpm. This is a very severe disadvantage in respect of chain-saws, in particular, since such engines have a very small fly-wheel with very low inertia and are liable to kick backwardly in the event of a backfire during starting. If there is then a spark with this reverse rotation, the engine can run backwards. In addition, there is also a problem with mopeds where the vehicle may be propelled rearwardly in the event of a backfire at starting.

It is desirable in the operation of internal combustion engines to provide an advanced spark at high engine speeds. This can be done by providing an additional spark (instead of advancing the timing of a single spark) and this method also finds application in the provision of ultra-reliable ignition circuits where a dual spark is required.

It is known from FIG. Nos. 12 and 13 of U.S. Pat. No. 4,163,437 to provide an ignition circuit within a fullwave rectifying diode bridge. The effect of the bridge is that at low speeds, only the main, say, positive pulse of the induced voltage in the primary winding, triggers the ignition circuit. However, at higher speeds, the rectified leading negative pulse of the induced primary winding voltage is of a sufficient magnitude to trigger the ignition circuit and therefore some advance of the timing of the spark is achieved. In addition, a dual spark is also achieved since, under these conditions of high speed, the ignition circuit fires on both the rectified leading negative pulse and the main positive pulse. Sometimes a third spark is also produced by the rectified trailing negative pulse.

However, this circuit suffers from a practical disadvantage in that the single ignition circuit must be arranged to trigger at low speeds in order to permit easy starting of the internal combustion engine. Thus as the rectified negative leading pulse is applied to the ignition circuit, the ignition circuit often triggers at low engine revolutions on this pulse. There is therefore a danger of a backfire, or even reverse running, since the spark is well advanced and the engine may not have sufficient speed to prevent the early explosion within the cylinder pushing the piston backwardly against the intended direction of rotation of the engine.

It is also desirable in some applications in which internal combustion engines are used, to provide a governor which limits the maximum engine speed. It has long been recognized that such a governor can be provided electronically if a suitable means can be found of turning the spark off at speeds above the predetermined engine speed. However, although electronic governor circuits are known, in the main they have not proved to be successful commercially, often because the governor circuit could only be provided at substantial expense or suffered from some of the other abovementioned disadvantages.

It is therefore the object of the present invention to provide an improved transistor ignition circuit which will substantially overcome, or ameloriate, at least one of the above mentioned disadvantages.

According to one aspect of the present invention there is disclosed a multiple spark transistor ignition circuit comprising a primary winding, a potential divider connected across the primary winding, a first transistor connected in parallel with the potential divider, a first resistor connected in parallel with the base-collector junction of the first transistor, and a second transistor having its collector-emitter conduction path connected in parallel with the base-emitter junction of the first transistor and having its base connected to a point of intermediate potential on the potential divider, characterized in that a halfwave rectifier is connected in series with the primary winding to permit primary winding current to flow only in the direction in which said first transistor conducts current. Preferably the halfwave rectifier takes the form of a diode connected between one end of the primary winding and the corresponding end of the potential divider. In addition, the halfwave recifier can be used to connect a plurality of ignition circuits in series or parallel with a single primary coil, or to connect a plurality of primary coils to an ignition circuit.

According to a second aspect of the present invention there is disclosed a governor for an internal combustion engine having a dual spark ignition apparatus wherein one of said ignition apparatus is arranged to have a moment of ignition before top dead centre, the other said ignition apparatus is arranged to have a moment of ignition after top dead centre, and said one ignition apparatus is disabled at engine speeds above a predetermined speed.

According to a third aspect of the present invention there is disclosed an electronic ignition circuit for a magneto operated internal combustion engine to provide an additional advanced spark at high engine speeds, said magneto including a magnetic yoke having a leading leg and a trailing leg with respect to the normal direction of engine rotation; a primary winding and a secondary winding; and a magnet carrying rotor rotatable relative to said yoke; characterized in that said electronic ignition circuit is arranged to be triggered by the voltage and/or current induced in said primary winding by the change of flux created in the trailing leg by the passage of the magneto magnets therepast and characterized in that a rectifier is connected between the primary winding of the magneto and said electronic ignition circuit whereby the voltage induced in said primary winding by the change of flux created in the leading leg by the passage of the magneto magnets therepast is blocked by said diode to effectively open circuit said primary winding and induce a spark creating voltage in said secondary winding.

Embodiments of the present invention will now be described with reference to the drawings in which;

FIG. 1 is a prior art circuit illustrated in FIG. 3 of the above mentioned U.S. Pat. No. 4,163,437 (Notaras);

FIG. 2 is a prior art circuit being a reproduction of FIG. 1 of U.S. Pat. No. 3,938,491 (Mazza) which was cited during the prosecution of the above mentioned Notaras U.S. Patent;

FIG. 3 is a reproduction of positive and negative polarity voltage or current waveform of FIG. 2 of the above mentioned U.S. Patent to Mazza;

FIG. 4 is a prior art circuit being a reproduction of FIG. 1 of U.S. Pat. No. 4,342,304 (Watanabe);

FIG. 5 is the circuit diagram of a first embodiment of the present invention;

Figure 15:
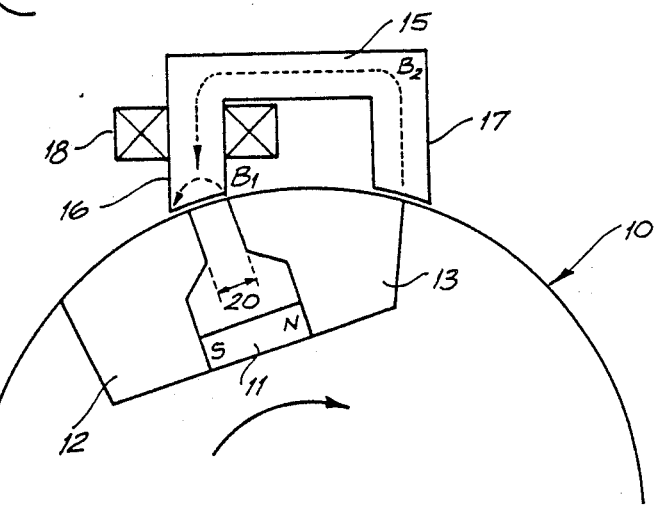
FIG. 15 is a schematic representation of the magneto rotor arrangement of an internal combustion engine at the time of ignition rotating in the forward direction.
Figure 21:
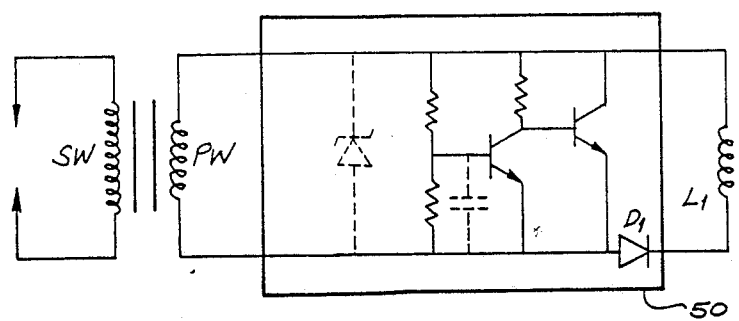
Figure 23:
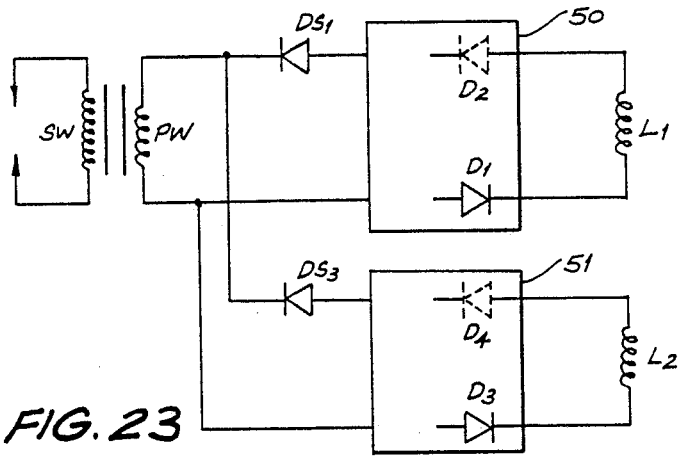
Figure 25:
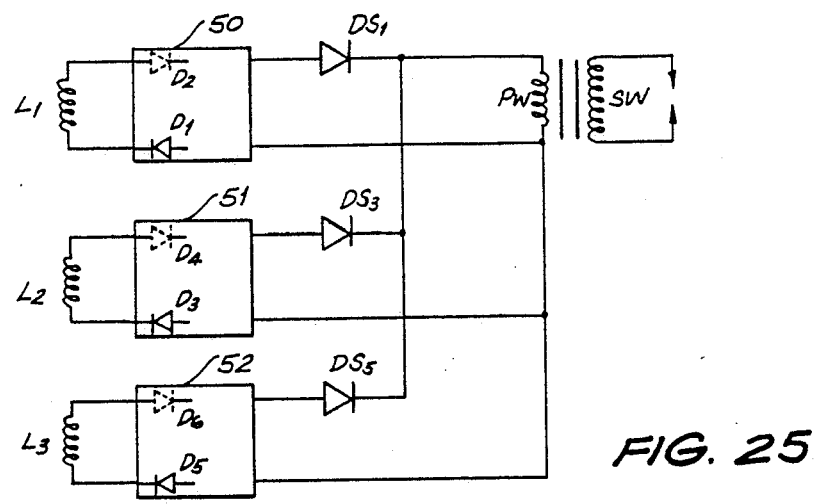
Figure 22:
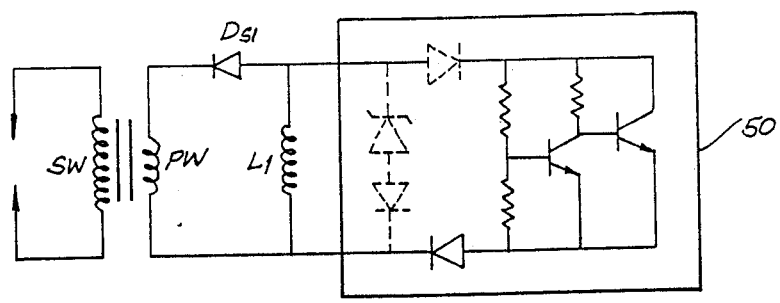
Figure 24:
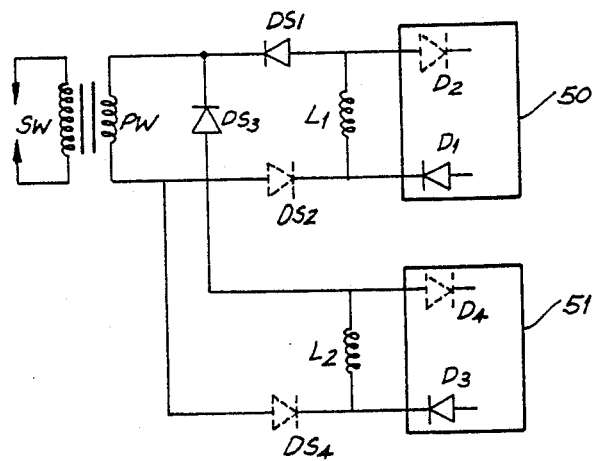
Figure 26:
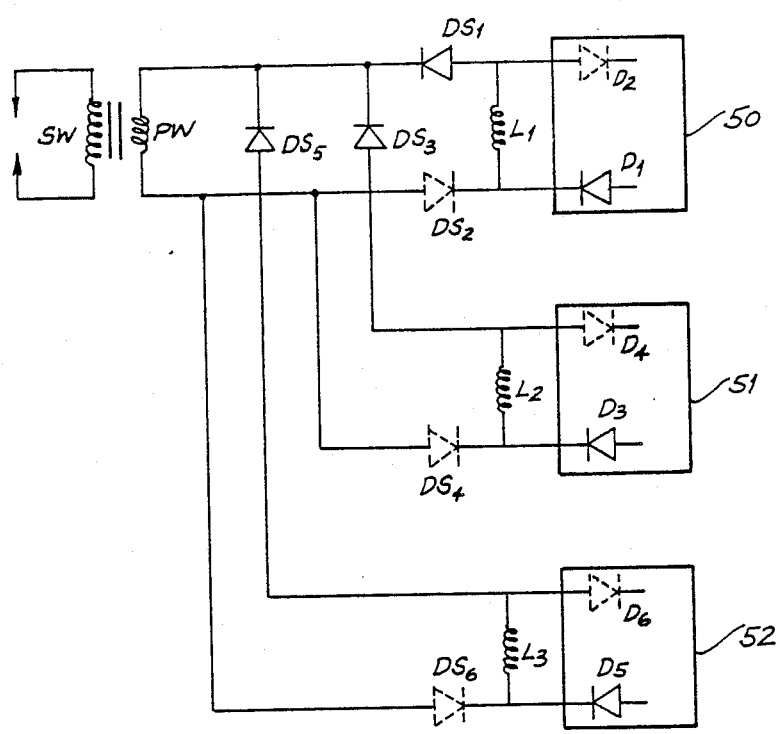
Figure 27:
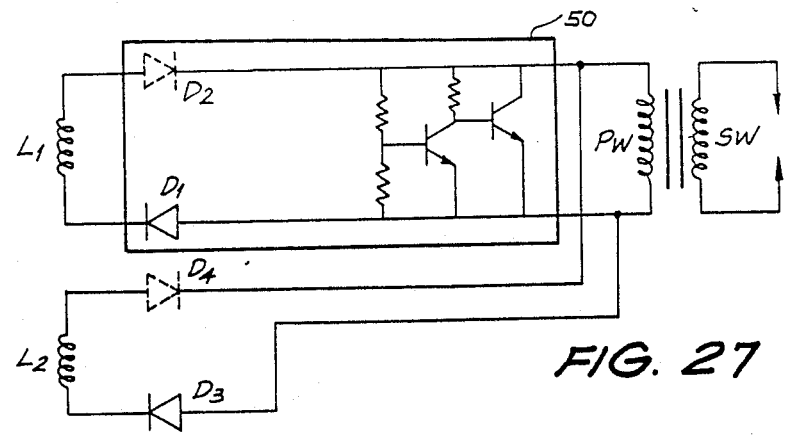
Figure 28:
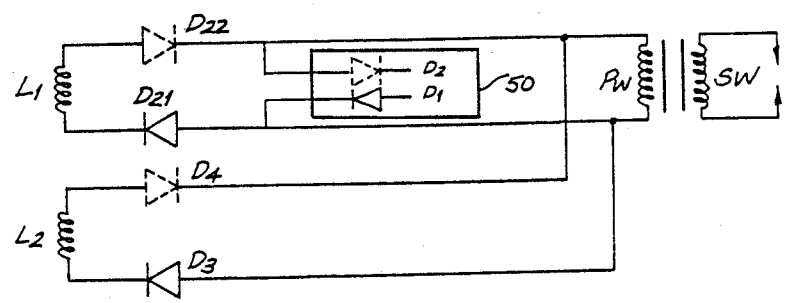
Figure 31:
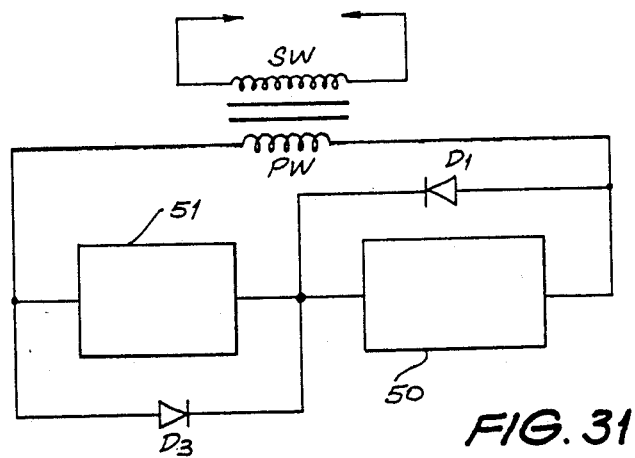
Figure 29:
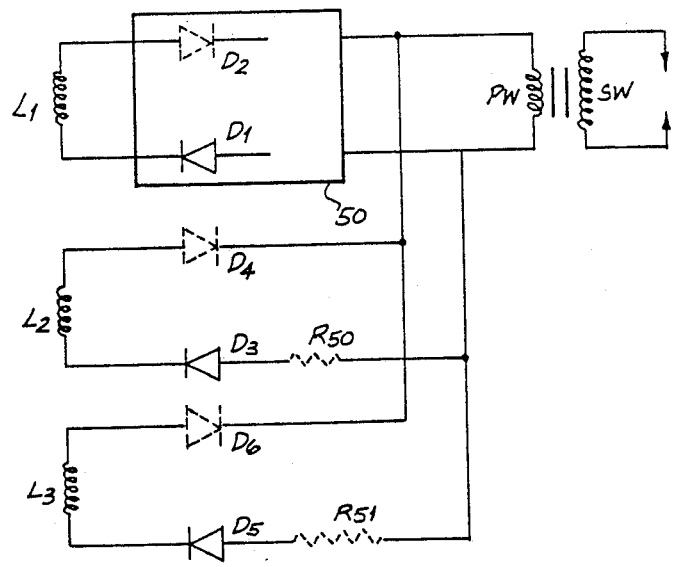
Figure 30:
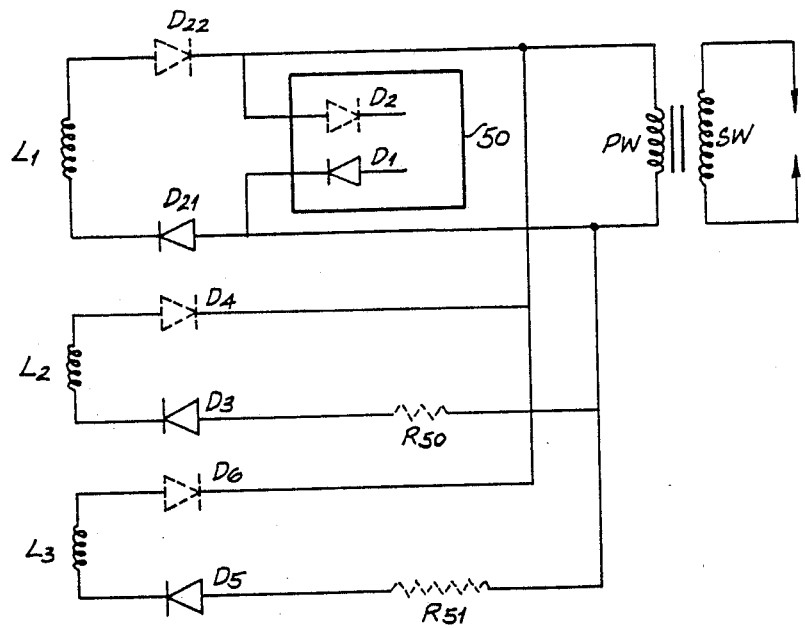
Figure 32:
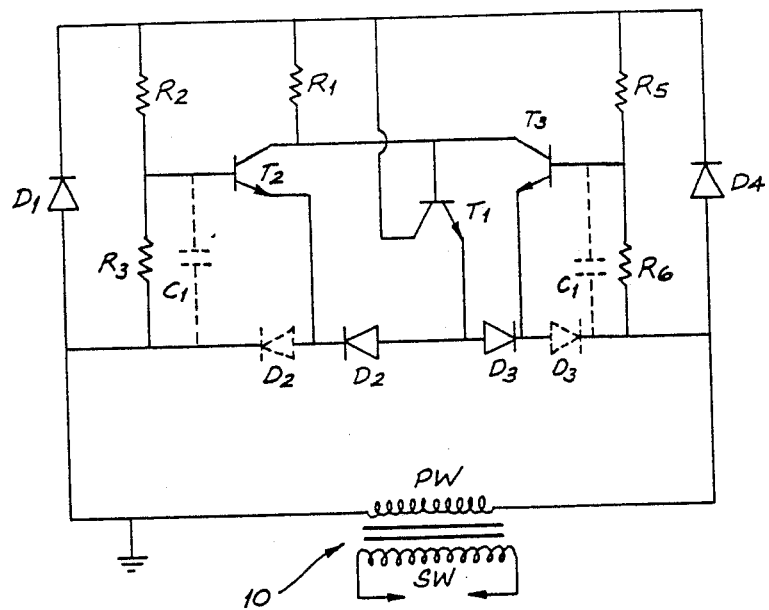
Figure 33:
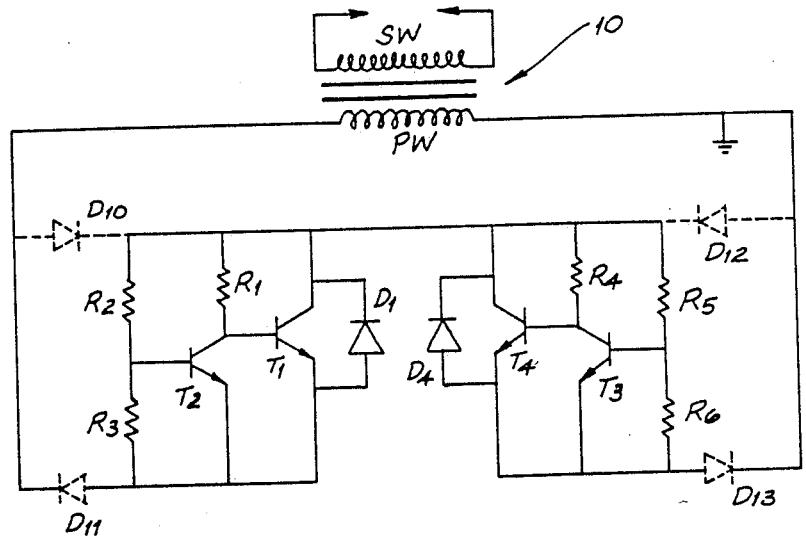
Figure 34:
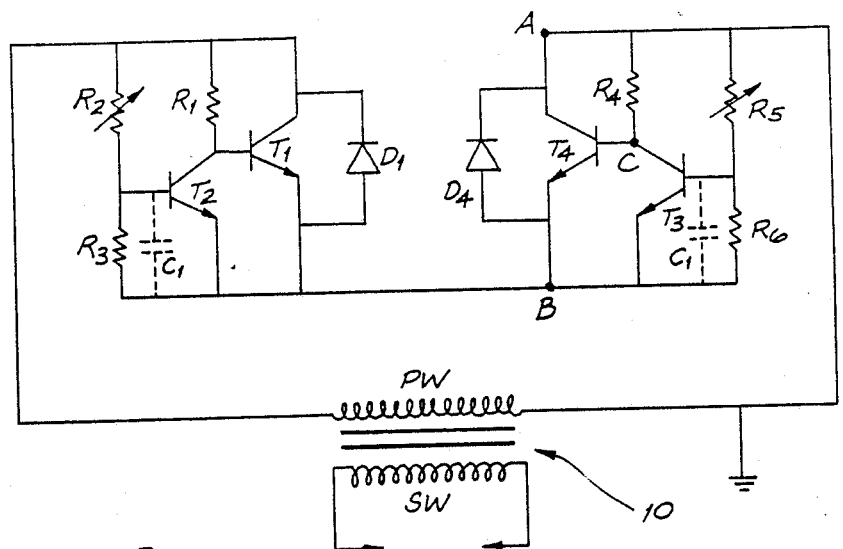
Figure 36:
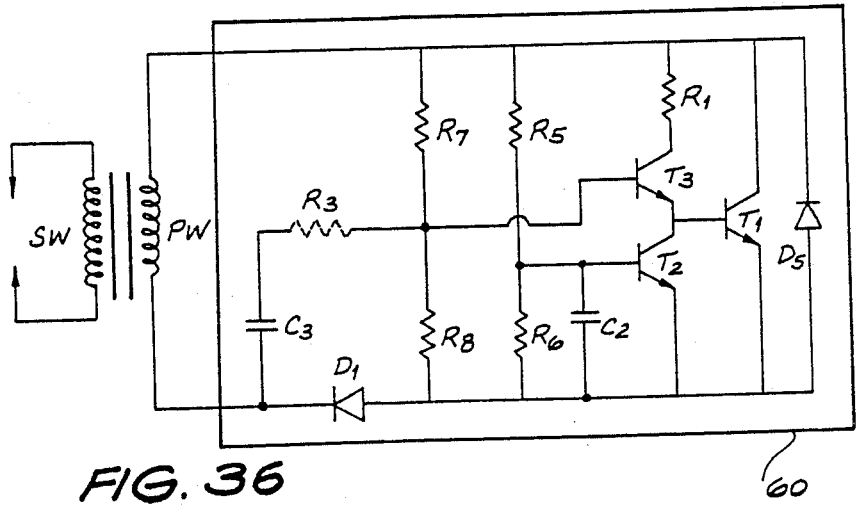
Figure 35:
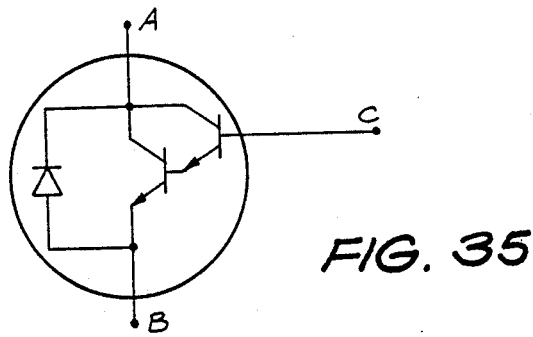
Figure 37:
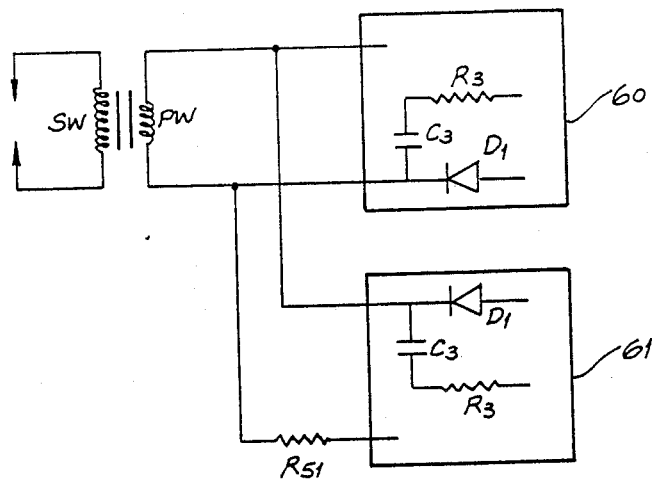
Figure 39:
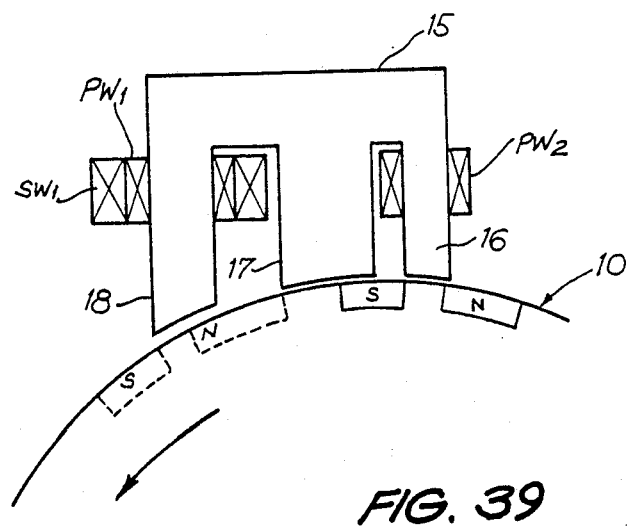
Figure 38:
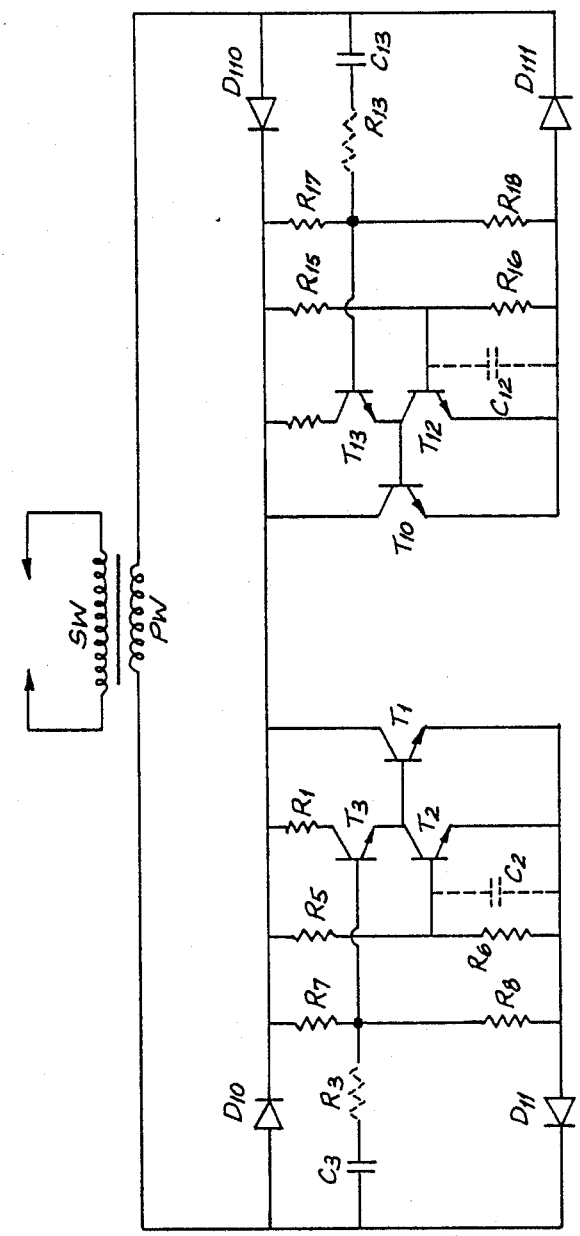
Figure 40:
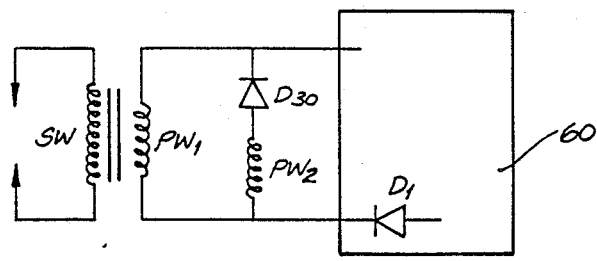
Figure 41:
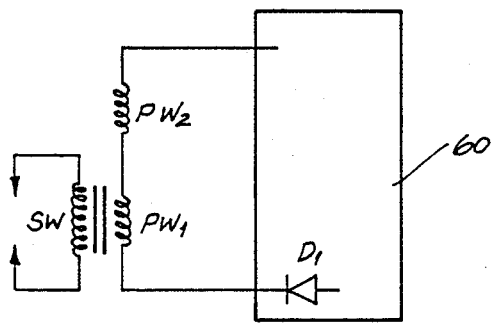
Figure 42:
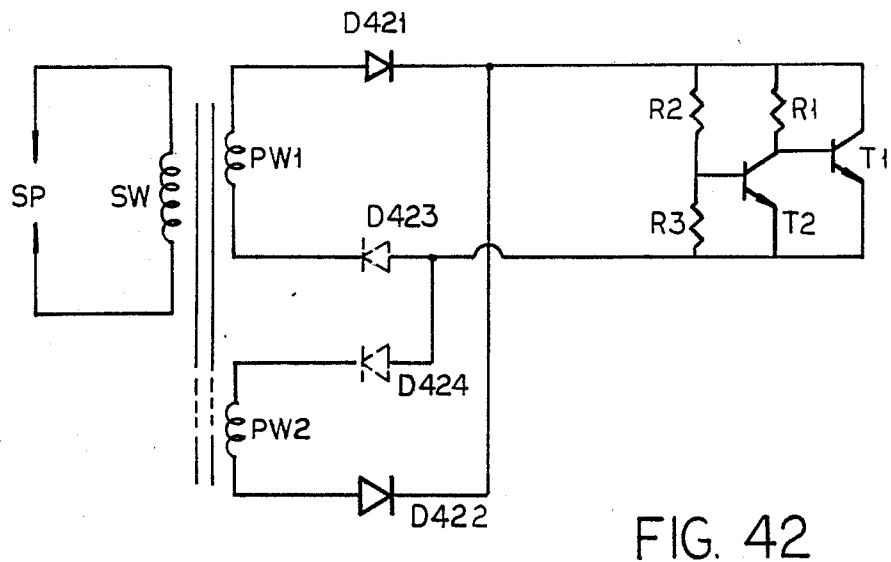
Figure 43:
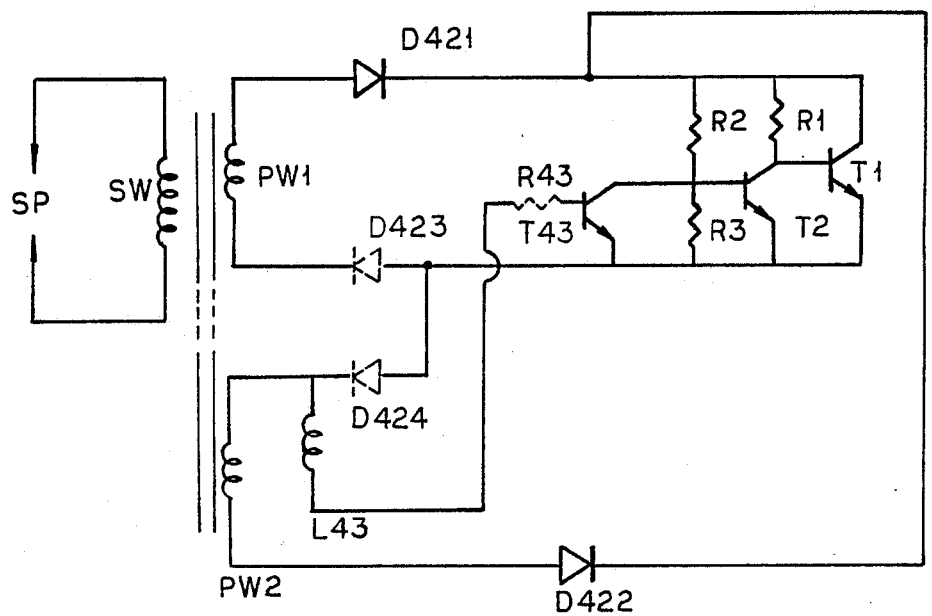
Figure 18:
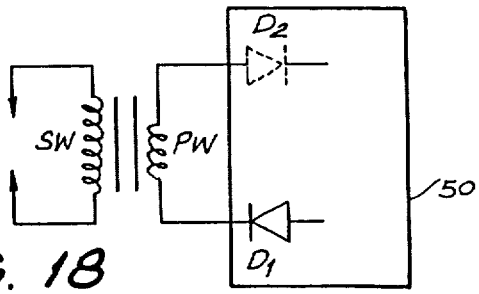
Figure 19:
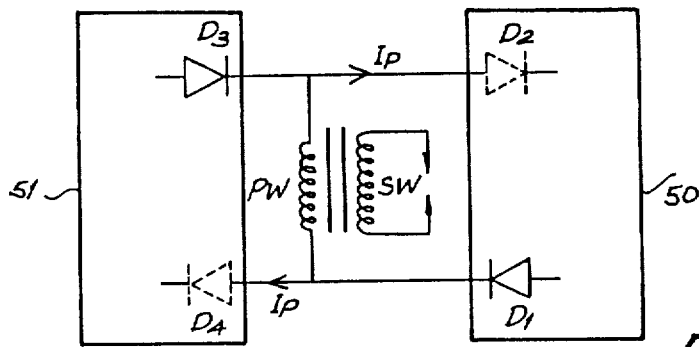
Figure 20:
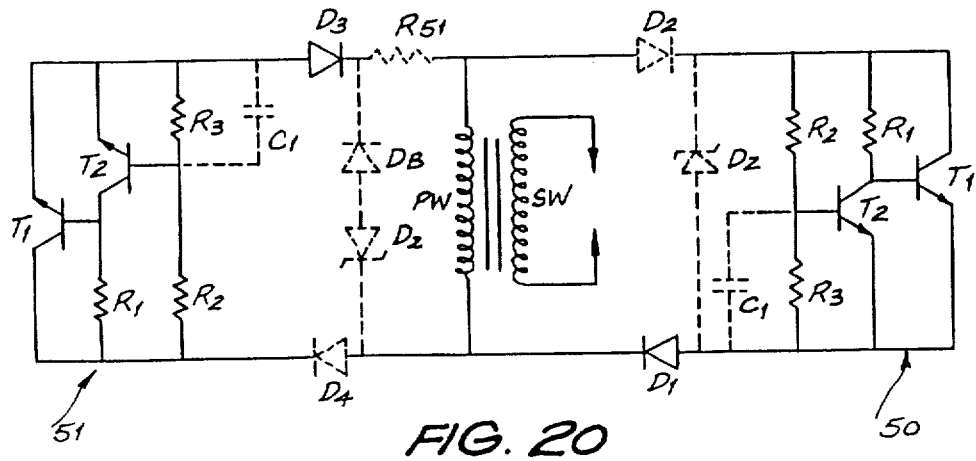

FIG. 18 substantially duplicates FIG. 5;

FIG. 19 shows a modification of FIG. 18 to achieve dual advanced sparkings;

FIG. 20 is a detailed circuit diagram of the arrangement of FIG. 19;

FIG. 21 is a circuit similar to FIG. 18 but for a remote primary winding;

FIG. 22 is an alternative circuit to that of FIG. 21;

FIG. 23 shows a modification to FIG. 21 to achieve dual advanced sparking;

FIG. 24 is an alternative circuit to that of FIG. 23;

FIG. 25 shows a modification to FIG. 23 to achieve triple advance sparking;

FIG. 26 is an alternative circuit to that of FIG. 25;

FIG. 27 shows an alternative arrangement to that of FIG. 23;

FIG. 28 is an alternative circuit to that of FIG. 27;

FIG. 29 shows an alternative arrangement to that of FIG. 25;

FIG. 30 is an alternative circuit to that of FIG. 29;

FIG. 31 shows an alternative arrangement to that of FIG. 19;

FIG. 32 shows a detailed circuit diagram incorporating the philosophy of FIG. 31;

FIG. 33 shows an alternative circuit to that of FIG. 32;

FIG. 34 shows an alternative circuit to that of FIG. 33;

FIG. 35 shows a modification to the circuit of FIG. 34;

FIG. 36 illustrates a circuit similar to that of FIG. 5 but which governs maximum engine revolutions;

FIG. 37 shows a modification to the circuit of FIG. 19 but incorporating the governor circuit of FIG. 36;

FIG. 38 shows a modification to the circuit of FIG. 31 but incorporating the governor circuit of FIG. 36;

FIG. 39 is a view similar to that of FIG. 15 but illustrating the magnetic yoke arrangement for use with the circuits of FIGS. 40 or 41;

FIG. 40 is a circuit diagram of an ignition circuit for use with the magnetic yoke arrangement of FIG. 39;

FIG. 41 is a circuit diagram of an alternative circuit to that of FIG. 40;

FIG. 42 is a circuit diagram of a further, stepped-advance ignition circuit; and FIG. 43 is a circuit diagram of a still further ignition circuit with stepped advance and governing or only governing.

Turning now to FIG. 1, the prior art circuit which represents the starting point of the present invention is illustrated and basically comprises FIG. 2 of U.S. Pat. No. 4,163,437 (Notaras). In this circuit the main switching transistor T1 and the bypass protection diode D5 (which protects both transistors T1 and T2 from large inverse voltages), are in practice realized by an integrated Darlington transistor with its associated by-pass diode. The capacitor C1 is a preferment as indicated by broken lines in FIG. 1. The method of operation of the circuit of FIG. 1 is fully explained in the above-mentioned Notaras U.S. Patent specification.

However, it is important to note that the transistor T1 when conducting current does do without being saturated, and that when the polarity of the primary winding PW is such that current does not flow through the transistor T1, then current is conducted in the reverse direction through the resistors R5 and R6. Where the by-pass diode D5 is present, current is conducted through that diode during the negative polarity portions of the generated magneto voltage.

Where the diode D5 is not present there is a substantial danger of reverse breakdown of the transistors T1 and/or T2 which therefore likewise permits primary wind current Ip to flow in the reverse direction to that illustrated in FIG. 1, that is when the primary winding voltage is negative.

At the moment of ignition, the current flowing into the base of transistor T2 is sufficient for transistor T2 to turn ON, thereby preventing further (non-saturated) conduction by transistor T1. The interruption caused thereby to the primary winding current induces an initial sparking voltage in the secondary winding SW. In addition, when transistor T2 conducts, since the resistance of resistor R1 is much less than the resistance of resistor R5, the current previously flowing through resistor R5 is by-passed to flow through resistor R1 and the collector-emitter path of transistor T2. This has the effect of turning transistor T2 off by depriving it of base current. Thus after the momentary turning ON of transistor T2, this transistor turns off and conduction of current via transistor T1 resumes. This repeated conduction is again interrupted by transistor T2 being turned ON, thereby creating a second spark. This process is repeated so long as the primary winding induced voltage remains sufficiently positive. The consequence is a shower of sparks at the moment of ignition. As will be explained hereafter with more detail, the present invention is based upon the imposition of a halfwave rectifier between the primary winding PW and the transistor ignition circuit so as to place the halfwave rectifier in series with the primary winding. The halfwave rectifier (diode D1 and/or D2 of FIG. 5) prevents conduction of any current in the primary winding PW in the direction opposed to the normal direction of conduction from collector to emitter of the transistor T1.

It is known from U.S. Pat. No. 3,963,015 (Bosch) and also from the above mentioned U.S. Pat. No. 4,163,437 (Notaras) to connect a full wave rectifier between the primary winding and the remainder of the ignition circuit for the purposes of achieving automatic advance of the time of ignition with increasing engine revolutions. The effect of the full wave rectifier is to rectify the, say, negative pulses of primary winding current which occur before and after the main (say) positive pulse of primary winding current. With increasing engine revolutions, the initial rectified pulse of current has increased to a level sufficiently large to cause triggering of the ignition circuit in advance of the normal positive pulse of primary winding current and in this way the desired advance of ignition is achieved.

FIGS. 2 and 3 of the present specification reproduce the drawings of U.S. Pat. No. 3,938,491 (Mazza) which was cited, but overcome, during the prosecution of U.S. Pat. No. 4,163,437 (Notaras). There are a number of very substantial problems with the circuit and accompanying description of the above mentioned U.S. Patent to Mazza. For example, the spark plug SP is not grounded, the secondary winding SW has fewer turns than the primary winding PW yet is expected to have a larger voltage, and the primary winding PW is connected in series with the secondary winding SW in an autotransformer connection so that the allegedly produced spark generating voltage which appears across the secondary winding SW also appears across the remainder of the circuit. Furthermore, a diode bearing the strange designation RC1 is connected in series with the series connected primary winding PW and the secondary winding SW. It is apparent from FIG. 3 of the present specification (which reproduces the current or voltage waveform of FIG. 2 of the Mazza specification) that magneto current flows during both the positive and negative portions of the induced current and voltage waveforms.

For the above reasons, the circuit illustrated in the above mentioned U.S. Patent to Mazza has been discounted as not being a practical circuit.

Furthermore, Mazza also states (column 3 line 18–19) that "diode RC1 is provided to protect the transistors" and this statement together with the statement (column 2 line 63–65) "Referring to FIG. 2, it will be appreciated that this is the form of voltage or current which would exist if the circuit were not interrupted." These statements together with Mazza's FIG. 2, clearly demonstrate that diode RC1 is not intended to function as a half-wave rectifier but to only protect the transistors from the high secondary voltage surge from the series connected secondary winding, in which RC1 would have to withstand thousands of volts, the equivalent to ignite the spark plug SP.

FIG. 4 duplicates FIG. 1 of U.S. Pat. No. 4,342,304 (Watanabe) which illustrates a circuit having some similarity to the circuit of FIG. 1 (which was cited during the prosecution of U.S. Pat. No. 4,342,304). However, the circuit of FIG. 4 uses a programmable unijunction transistor T11 to trigger a transistor T9 to, in turn, cause Darlington transistor T7 to cease conduction at the moment of ignition. Since the programmable unijunction transistor T11 delivers only a single pulse of current to the transistor T9, it is clear that the circuit of FIG. 4 cannot create any multiple sparks.

This will also be clear from a realization that the pulse of current delivered by the programmable unijunction transistor T11 to the transistor T9 is caused by the rapid discharge of capacitor C13. During the relatively brief period in which the induced primary winding voltage is positive, there is insufficient time for the capacitor C13 to be re-charged at the moment of ignition because of the time constant formed by resistor R12 and capacitor C13. Thus there is no possibility of a shower of sparks at the moment of ignition.

The circuit of FIG. 4 apparently discloses, only by means of dotted lines, a diode which is undesignated in U.S. Pat. No. 4,342,304 (Watanabe). Furthermore, the purpose and function of this dotted undesignated diode are not described or discussed in the specification of this U.S. Patent which does not mention this diode anywhere in the description.

Furthermore the waveforms of current (and voltage) shown in Watanabe are only for the time immediately prior to ignition, during ignition and immediately after ignition. The ignition point is t (column 3, line 55–56) and does not include the total waveform for each cycle. Hence there is only displayed the positive pulse of a negative-positive-negative magneto waveform, which occurs in his circuit with negative current resulting from the by-pass diode D4 and the positive current resulting from transistor 7 being in conduction.

Watanabe FIG. 2(d) clearly shows a negative pulse immediately after ignition which is consistent with by-pass diode 4 plus resistor 3 conducting primary winding current.

Watanabe FIG. 2(c) shows current flow IA through the unijunction transistor T11 at t and is naturally positive to be effective.

Watanabe FIG. 2(b) shows Anode and Gate voltages which also will only operate when positive.

However, Watanabe FIG. 2(a) as previously stated, is only displaying the positive pulse and not the total negative-positive-negative wave-form of the circuit. Watanabe states (column 3, line 26–31), "Therefore when the potential at the point P1, that is as the base rises, the collector and emitter of the transistor 6 will conduct, the abovementioned primary winding 1a will be short circuited and such primary short circuiting current as shown in FIG. 2(a) will be fed to it." He clearly states that his FIG. 2(a) is only during transistor 6 conduction, which of course can only illustrate a positive pulse.

Furthermore, Watanabe (column 3 line 15–18) states "By the way, the wave form of the current produced in the primary winding 1a at this time is shown in FIG. 2(a). At this time, the power transistor 7 will not be interrupted." This further illustrates that Watanabe has only intended his FIG. 2(a) to be positive as the positive pulse only occurs at this time, that is at the time of conduction of transistor 7.

Hence because Watanabe FIG. 2(d) illustrates a negative current and because his FIG. 2(a), as explained above, shows only the positive pulse of a negative-positive-negative waveform of his circuit, this clearly shows that the by-pass diode 4, which is clearly illustrated and designated in the prior art, is operative, and that the dotted undesignated completely non described diode is totally non functioning and in reality is not a part of the designated prior art circuit.

It is known from U.S. Pat. No. 4,173,963 (Siemens) to provide a diode D3 in series with the primary winding n1. However, this circuit has three coils (other than the secondary winding) since it requires the use of a pair of separate control or trigger coils S1 and S2 thereby leading to a different type of ignition circuit with its associated additional bulk and expense in the magneto construction. Furthermore, a thyristor or SCR Th is used which can only be triggered once and does not cease conduction until its current drops below the holding current, thereby resulting in only a single spark at the moment of ignition. These two features are to be contrasted with the present invention which is concerned with a shower of sparks at the time of ignition produced by a single coil (other than the secondary winding).

Although this specification discloses a magneto construction which produces an advanced spark with increasing engine revolutions, this desirable result is achieved by the bulky and expensive two extra coils S1 and S2. These coils cannot be retro-fitted to existing engines by their owners and complicate the assembly procedures for engine manufacturers. Neither of these disadvantages are present if the spark advance can be achieved by electronic components which are compact, relatively inexpensive and highly reliable.

U.S. Pat. Nos. 4,174,697 (Bosch) and 4,178,892 (Bosch) disclose a diode 17 connected in series with the main switching transistor 16. However, this diode 17 does not constitute a halfwave rectifier since negative current through the primary winding is conducted by capacitor 24, resistor 23 and zener diode 22 in both patents. A similar comment applies to U.S. Pat. No. 4,395,981 (Bosch) with the negative primary winding current being conducted via resistors 19, 21, and 24.

In addition, U.S. Pat. Nos. 4,188,929 (Bosch) and 4,329,950 (Bosch) both disclose a diode 17 connected in the body of the circuit and in series with the main switching transistor 16. However, this diode 17 does not constitute a halfwave rectifier since negative primary winding current is conducted through resistor 30 and diode 31; and resistor 23 and diode 24 respectively.

Finally, U.S. Pat. No. 4,401,096 (Bosch) discloses a diode 35 connected in parallel with a resistor 34 and capacitor 33 in a biasing network. However reverse polarity primary winding current can flow via capacitor 31, zener diode 32, resistors 30 and 34 and capacitor 33.

FIG. 5 illustrates the circuit arrangement of the first embodiment of the present invention in which a halfwave rectifier in the form of diode D1 (or diode D2 as indicated by dotted lines, or both), is connected in series with the primary winding PW so as to permit primary winding current to flow only in the direction in which the first transistor T1 conducts current. Thus the primary winding current is blocked during the (say) negative portions of the voltage induced in the primary winding PW by the movement of the magnet carrying rotor of the magneto past the primary winding PW.

It has been experimentally determined that the multiple spark circuit of FIG. 5 results in four improvements over the prior art circuits and, in particular, the prior art circuit of FIG. 1. These improvements are that the magnitude of the spark voltage produced in the secondary winding SW at engine running speeds is noticeably increased; that retardation of the time of ignition with increasing rpm, especially at high engine speeds, is negligible; and that ignition with reverse engine rotation is substantially prevented, at least at engine revolutions less than or equal to the maximum reverse engine revolutions expected to be encountered in practice; and for some magneto geometries, a progressive advance of approximately 20° of the moment of ignition with increasing engine speed is achieved. These advantages are able to be achieved together with multiple sparks at the time of ignition.

In order to understand the first of these unexpected and advantageous results, reference will now be made to FIGS. 6 to 13 respectively. Each of these figures is a graph of the short circuit primary winding current as a function of time at a particular engine speed, and for a particular magneto yoke construction. FIGS. 6 to 9 are for a two-legged magneto yoke or coil-carrying magnetically permeable core, whilst FIGS. 10 to 13 are for three-legged cores. FIGS. 6, 7, 10 and 11 are unrectified short circuit Primary Winding currents whereas FIGS. 8, 9, 12 and 13 are the halfwave rectified short circuit primary winding currents produced by connecting only the diode D1 in series across the primary winding PW. FIGS. 6, 8, 10 and 12 are at low engine speeds whereas FIGS. 7, 9, 11 and 13 represent the position at higher engine speeds in the normal operating range.

It will be seen from FIGS. 6, 7, 10 and 11 that both two-legged and three-legged cores produce a short circuit primary winding current waveform which has essentially three portions namely, a leading (negative) portion, a positive portion during which it is intended ignition should occur, and a third trailing negative portion. For two-legged cores, the trailing negative portion is relatively smaller than the initial leading negative portion whereas for three-legged cores the trailing negative portion is generally of larger magnitude than the leading negative portion. As expected, the magnitude of the short circuit primary winding current increases with increasing rpm. However, generally speaking the relative proportion of the waveform changes so that steeper rise times are encountered at higher engine revolutions.

The halfwave rectified voltage waveforms illustrated in FIGS. 8, 9, 12 and 13 correspond respectively to the conditions which resulted in the waveforms of FIGS. 6, 7, 10 and 11. For the waveforms of FIGS. 8, 9, 10 and 13 it is noticed that, as expected, there is no negative current flow and that there is only a pulse of positive current. However, unexpectedly, the magnitude of the current pulse is increased and a generally sharper rise time of the leading edge of the current pulse is unexpectedly produced.

Figure 6:
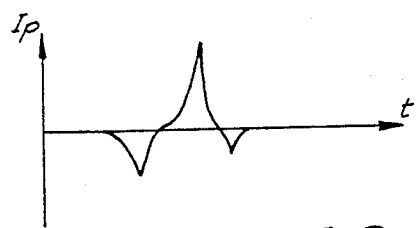
FIGS. 6 to 13 are graphs of the short circuit primary winding current of a magneto in accordance with circumstances to be described hereinafter.
Figure 8:
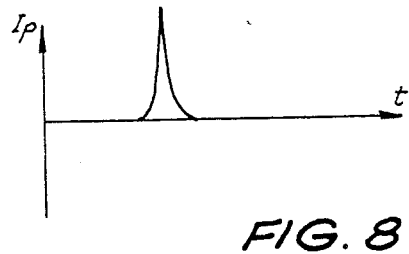
Figure 7:
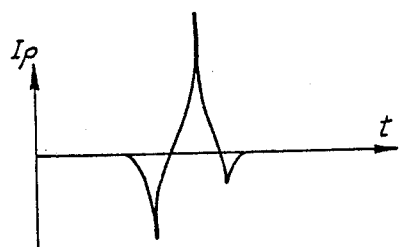
Figure 9:
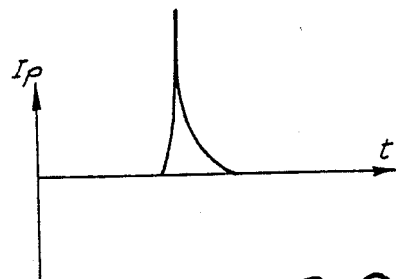
Figure 10:
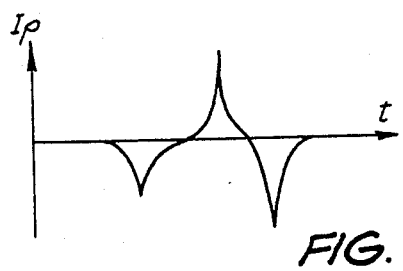
Figure 12:
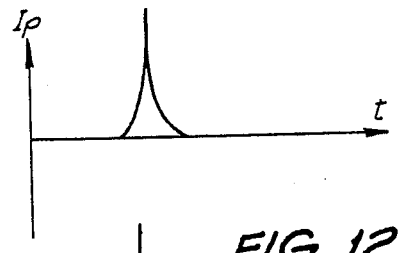
Figure 11:
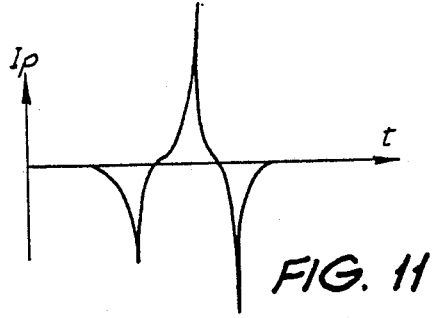
Figure 13:
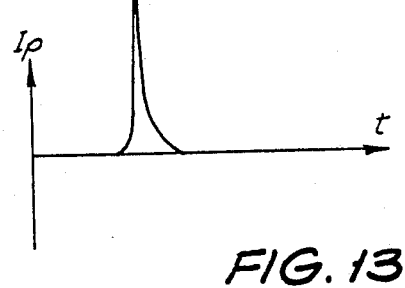
Figure 14:
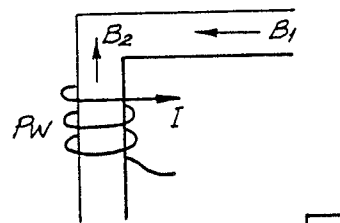
FIG. 14 is a schematic diagram illustrating the flow of magnetic flux and the flow of current in a magneto.

A possible theoretical basis for these experimentally observed results may be as follows. With reference FIG. 14, the movement of the magnet carrying rotor past the permeable coil carrying core of the magneto, results in an induced magnetic flux B1 which, during the initial negative induced voltage, tends to induce a current I in the primary winding PW which initially, is allowed to flow, and is also negative. However, as a result of the action of Lenz's Law, the flow of negative current also induces a magnetic flux B2 which opposes the direction of the magnetic flux B1 induced by the motion of the magnet carrying rotor. Thus the net flux in the yoke is the difference between the fluxes B1 and B2.

As a consequence, when the induced primary winding voltage changes polarity, the rate of change of flux is reduced where negative Primary Winding current is allowed to flow, since the absolute value of the magnetic flux in the core is reduced because of the current flow. As the absolute value of the flux is reduced, but the time of rotor operation remains substantially the same, it follows that the rate of change of that flux with time is itself also reduced. That is to say, with the half-wave rectifier, because no negative primary winding current flows, the magnetic flux immediately before the commencement of positive primary winding current flow is higher than would be the case had negative primary winding current been allowed to flow.

Another factor is thought to be that where negative primary winding current is allowed to flow during the initial (negative) portion of the voltage waveform, then because of the inductance of the primary winding PW, the primary winding current tends to slightly lag the primary winding voltage in a generally sinusoidal manner. However, where no negative primary winding current flows, at the changeover of primary winding induced polarity, a positive primary winding current is permitted to flow and its waveform is determined by the factors which govern the initial flow of current through an inductor when it is connected to a positive D.C. voltage source. Thus there is an initial steep exponential rise followed by, if conditions permit, gradual assumption of a final steady state current. It is thought that this exponential initial increase also to some extent accounts for the noticeably steeper rise time of the voltage waveforms of FIGS. 8, 9, 12 and 13.

Experimentally determined results for the secondary winding sparking voltage for the circuits FIGS. 1 and 5 at the same engine running speed are as follows:

| Circuit | Secondary Winding Voltage |
|---|---|
| FIG. 1 no diode D1 no capacitor C1 | 20 kV |
| FIG. 1 no diode D1 with capacitor C1 | 25 kV |
| FIG. 5 with diode D1, no capacitor C1 | 27 kV |
| FIG. 5 with diode D1, with capacitor C1 | 30–35 kV |

Thus it will be seen that although for both circuits, the presence of the optional capacitor C1 increases the magnitude of the sparking voltage, the presence of a halfwave rectifier in the form of diode D1 substantially increases the sparking voltage both with and without the capacitor C1.

It is thought that the increased sparking voltage produced because of the presence of capacitor C1 occurs as a result of the time of ignition being delayed because of the need to partially charge C1 prior to the conduction of transistor T2, so that the transistor T2 first conducts at a later stage during the positive pulse of primary winding current, at which time a higher current magnitude for the primary winding current has been achieved. The interuption of a primary winding current of higher magnitude results in an induced secondary winding voltage of increased magnitude.

In addition, it has been experimentally determined that the circuit of FIG. 5 results in an improvement in the time of ignition at engine running speed. For the same machine at the same engine running speed, the following times of ignition have been experimentally determined as follows:

| Circuit | Time of Ignition |
|---|---|
| FIG. 1 no diode D1 no capacitor C1 | 22° BTDC |
| FIG. 1 no diode D1, with capacitor C1 | 10° BTDC |
| FIG. 5 with diode D1, no capacitor C1 | 25° BTDC |
| FIG. 5 with diode D1, with capacitor C1 | 24° BTDC |

It will therefore be seen that the presence of a halfwave rectifier in series with the primary winding PW substantially prevents retardation of the time of ignition and, in particular, where the capacitor C1 is also used, retardation of the time of ignition is substantially prevented and a shower of sparks of substantially increased magnitude result.

It is thought that the absence of retardation of the time of ignition brought about by the presence of the halfwave rectifier is based upon the following theroretical consideration. For the circuit of FIG. 1, even with the presence of a by-pass diode such as diode D5, during the leading pulse of negative Primary Winding current, the capacitor C1 when present is at least partially negatively charged, even if the maximum negative voltage able to be reached by the capacitor C1 is the forward bias voltage (approximately 0.7V) of the diode D5. The effect of this negative charge is that, during the period when the primary winding current is positive, the negative charge stored in capacitor C1 must first be discharged, and then the capacitor C1 must be positively charged, in order for the base of transistor T2 to reach a sufficiently high positive voltage in order for the transistor T2 to conduct from collector to emitter, thereby causing ignition.

Clearly, with the presence of the halfwave rectifier in series with the primary winding PW, the capacitor C1 cannot be negatively charged, and thus this retardation of the time of ignition is avoided.

The above explanation also accords well with the experimentally determined result that for the circuit of FIG. 1 with the capacitor C1, there is increasing retardation of the time of ignition with increasing engine revolutions. This can be explained by the increased magnitude of the initial negative pulse of primary winding current providing more and more negative charge which is then stored in the capacitor C1. Since the effect of increasing retardation with increasing engine speeds does not occur, or does not occur to the same substantial extent, with the circuit of FIG. 5, this also supports the above mentioned theoretical explanation.

Illustrated by means of broken lines in FIG. 5 are two alternative arrangements to protect the circuit components from excessive voltages. Either a zener diode DZ only can be provided, or, if located on the coil side of diode D1 and/or diode D2, then together with a blocking diode DB. These protection measures are not essential but are preferred.

Figure 16:
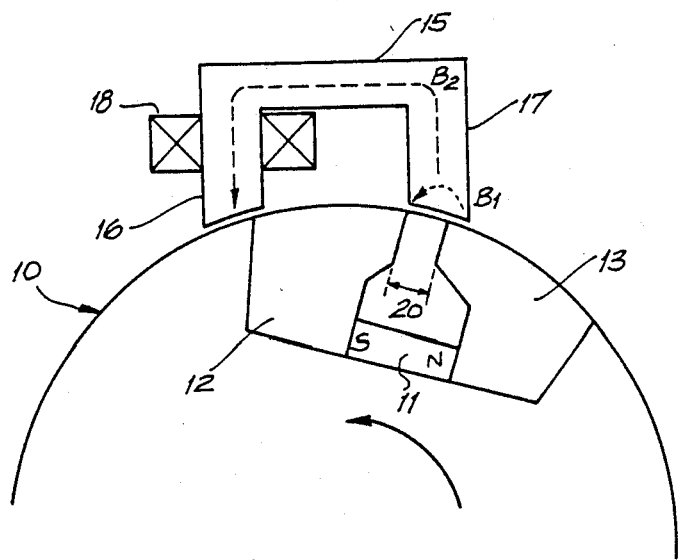
FIG. 16 is a representation similar to that of FIG. 15 but illustrating the possible time of ignition during reverse rotation.

Turning now to FIGS. 15 and 16, the problem of ignition with reverse direction of engine rotation for ignition circuits having a single coil (other than the secondary winding) will now be discussed. Naturally the problem of reverse running does not arise for ignition circuits having extra trigger coil(s). FIGS. 15 and 16 illustrate schematically the situation which occurs where a magnet carrying rotor is rotated past a coil carrying yoke. The rotor 10 of the magneto carries a magnet 11 having a north pole N and south pole S. The magnet 11 is interposed between two magnetically permeable pole pieces 12 and 13. Thus pole piece 12 presents a south magnetic pole whereas pole piece 13 presents a north magnetic pole.

In FIGS. 15 and 16, the rotor 10 is rotated past a two-legged magnetically permeable yoke 15 having a leading leg 16 and a trailing leg 17. The leading leg 16 carries an ignition coil 18 including both the primary winding and secondary winding (both not illustrated). The legs 16 and 17 are separated from the rotor 10 by means of a small air gap.

Although other constructions of the rotor and yoke are possible, for example those yokes having three legs, the considerations to be discussed below are substantially similar for all configurations and the resulting current waveforms are substantially the same (as will be seen from FIGS. 6, 7, 10 and 11).

It will be observed that the geometry of the yoke 15 and pole pieces 12, 13, is such that the gap 20 between the pole pieces 12, 13 is normally of a lesser circumferential extent than the circumferential extent of each of the legs 16, 17. In addition, the circumferential extent of each of the pole pieces 12, 13 normally exceeds the minimum circumferential extent between the adjacent edges of the legs 16, 17.

FIG. 15 represents the situation for forward engine rotor rotation in the direction of the arrow indicated in FIG. 15 just at the moment of ignition. Prior to the moment of ignition, magnetic flux extends along the flux path B1 indicated by broken lines form the north pole piece 13, through the leading leg 16 only, and thence to the south pole piece 12. Thus this flux does not pass through the yoke 15 nor cut many of the turns of the primary winding of the ignition coil 18.

However, at the moment of ignition, the trailing edge of the north pole piece 13 at the gap 20 moves away from the trailing edge of the leading leg 16. As a consequence, magnetic flux is then able to pass with relatively little reluctance, from the north pole piece 13, through the trailing leg 17, yoke 15, and thence to the leading leg 16 and the south pole piece 12. As a result, there is a rapid change of flux along the path B2 indicated by dotted lines, through the ignition coil 18 thereby resulting in ignition. Furthermore, the waveforms illustrated in FIGS. 6, 7, 10 and 11 also result depending upon the nature of the yoke 15 (i.e. whether it has two legs or three legs as discussed above). Typically, the desired time of ignition is adjusted so as to be in the vicinity of approximately 25° BTDC (depending on engine design) and this is determined by the mechanical position of the rotor 10 relative to the engine shaft.

FIG. 16 illustrates the situation which arises when the rotor 10 is rotated in the reverse direction indicated by the arrow on FIG. 16. Here, prior to ignition, the now trailing edge of the south pole piece 12 and the now leading edge of the north pole piece 13 are both located under the now leading leg 17. Thus, even though the now leading edge of the south pole piece 12 is located under the now trailing leg 16, magnetic flux flows from the north pole piece 13 along the flux path B1 indicated by dotted lines directly to the south pole piece 12 via only the lower portion of the now leading leg 17. Thus very little flux cuts the ignition coil 18.

However, with continued rotation of the rotor in the reverse direction as illustrated in FIG. 16, the trailing edge of the south pole piece 12 adjacent the gap 20 moves away from under the now trailing edge of the now leading leg 17. In consequence, magnetic flux is able to flow along the path B2 indicated by dash lines from the north pole piece 13, through the yoke 15, including the leg 16, and thence to the south pole piece 12. In consequence, there is a rapid rate of change of flux through the ignition coil 18 which gives rise to a possible ignition condition as will be explained hereafter.

The net effect of the reverse direction of rotation is that the current waveforms of FIGS. 6, 7, 10 and 11 are substantially duplicated but at a reduced magnitude since stray flux from leg 17 to the rotor 10 does not cut the coil 18 for the reverse direction of rotation.

In addition, because of the slightly changed geometrical relationship since the time of potential ignition during reverse rotation occurs when the gap 20 is located under the leg 17 rather than under the leg 16, typically, the moment of potential ignition for reverse rotation occurs at a mechanical position of, say, 5° ATDC (after top dead centre). However, since at this time the engine is running in reverse, this is equivalent to 5° BTDC (before top dead centre) for reverse rotation. For two-stroke engines, this represents a potential stable ignition time and therefore if a spark should occur, operation of the engine with reverse rotation is possible.

It will be apparent to those skilled in the art, that for the prior art circuit of FIG. 1, for example, if the waveforms of FIGS. 6, 7, 10 and 11 are of sufficient magnitude ignition can occur with reverse rotation.

Fortunately, since for reverse rotation, the positive pulse of primary winding current is of smaller magnitude, this means that the potential minimum ignition engine speed is higher than that for the forward direction of rotation. However, this can still represent a severe practical problem where the potential ignition speed for ignition in the reverse direction of rotation is substantially less than 3,000rpm. This reverse rotation speed is commonly achieved in practice in many small engines, especially where, as for chain saws, the inertia of the rotor is negligible and thus a single back fire at starting can produce high speed reverse rotation.

It has experimentally determined that for the circuit of FIG. 5 including the capacitor C1, no ignition results for reverse running at speeds up to the practical maximum reverse rotor rotation speeds of the order of 3,000rpm. Since reverse rotation at speeds in excess of this maximum speed are in practice never encountered, even if ignition should eventually occur with reverse running, this does not represent a practical problem.

It is thought that a possible theoretical explanation for the above mentioned experimental result is that the capacitor C1 results in a sufficient delay (because of the need to charge same towards the turn-on voltage of the transistor T2 and given the relatively low magnitude of the positive primary winding current pulses with reverse rotation), such that the conditions for ignition do not occur at or adjacent to the time of the peak of the positive primary winding current pulse.

The above described experimental results have been achieved for the preferred values of the components of the circuit of FIG. 5, the range of values of which are indicated in the following table:

TABLE

| Component | Minimum | Maximum | Preferred Values |
|---|---|---|---|
| Resistor R1 | 0.5 kOhm | 7.5 kOhm | 1 kOhm |
| Resistor R2 | 2 kOhm | 15 kOhm | 5 kOhm |
| Resistor R3 | 0.5 kOhm | 5 kOhm | 1 kOhm |
| Capacitor C1 | 0.1 uF | 10 uF | 1 uF |

Where the conditions of use of the internal combustion engine require that an advanced spark be provided at high engine speeds, this can be accomplished in accordance with the present invention by providing an additional spark, instead of advancing the timing of a single spark.

At high engine speeds in accordance with one embodiment, it is possible to provide an advanced spark in addition to the normal spark (or shower of sparks).

Figure 17:
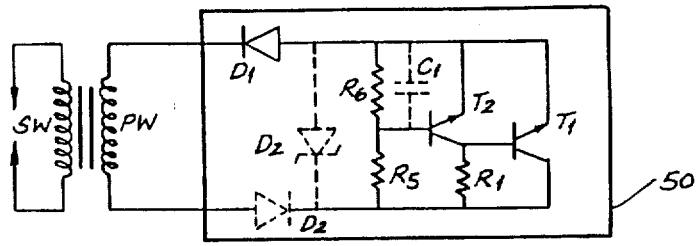
FIG. 17 is a circuit diagram of another embodiment of the present invention giving a second, advanced, spark.

Thus, the circuit of FIG. 5 with the modification of reversed circuit connections as illustrated in FIG. 17 has a further advantage in relation to the production of an advanced spark at high engine revolutions. This advantage is that the circuit of FIG. 17, because of the provision of diode D1 (and/or diode D2), results in the primary winding PW being open circuited during the period when the leading induced (negative) voltage pulse is generated.

It is known that with conventional mechanical breaker points, at high engine revolutions, if the mechanical points are held or maintained as an open circuit and the condenser or capacitor connected in parallel with the points is disconnected (thereby effectively open circuiting the primary winding), a secondary spark is produced because the rate of change of flux in the magnetic circuit generates a sufficient voltage in the secondary coil to produce a spark.

For the circuit of FIG. 17, at low engine speeds the flux and rotor relationships at the single moment of ignition are as illustrated in FIG. 16 save that the direction of rotation is opposite to that illustrated (i.e. normal direction of rotation as illustrated in FIG. 15) and the direction of the flux B2 is reversed. The reversal of flux occurs because the south pole piece 12 when located only under trailing leg 17 draws magnetic flux from the north pole piece 13 via leakage paths into the leading leg 16.

Thus the time of the single moment of ignition at low rotor speeds is approximately 5°-10° BTDC. At this time the circuit 50 operates in the normal manner as described above.

However, at high engine speeds the relationship of the flux and rotor at approximately 25°-30° BTDC are as illustrated in FIG. 15. Here a very substantial change of flux occurs in the direction of the flux illustrated for flux B2. However, because the circuit 50 is reverse poled by diode D1 (and/or diode D2), no current is conducted by the primary winding PW.

Even though there is no current flow in the primary winding, the voltage induced in the secondary winding is sufficiently high to create a spark of high voltage and long duration. This spark at 25°-30° BTDC is in addition to the spark or shower of sparks which still occurs at 5°-10° BTDC.

This arrangement is to be contrasted with the conventional arrangement of ignition circuits which are arranged to be triggered by the change of flux at the leading leg. Thus if a diode (of correct polarity) were connected between the primary winding and the remainder of such ignition circuits, an additional spark at high engine speeds would be created by the change of flux created in the trailing leg by the magnets moving past this leg. Since this spark would be after top dead centre no effect on the engine operation would be observed.

Conventional arrangements have the primary and secondary windings located on the leading leg. To obtain an additional advanced spark a diode (e.g. D1) is necessary and it is also necessary to reverse connect the ignition circuit (i.e., as illustrated in FIG. 17). If the primary and secondary windings should happen to be on the trailing leg, then only a diode is necessary.

Turning now to FIG. 18, the circuit of FIG. 5 is duplicated, however, the circuit details of the ignition circuit 50 are omitted for clarity.

A further embodiment for achieving an additional spark or shower of sparks at high engine speeds is illustrated in FIG. 19 in which the circuit of FIG. 18 is essentially duplicated, there being two substantially identical ignition circuits 50 and 51 each connected by means of a halfwave rectifier in the form of diode D1 (and/or diode D2) and diode D3 (and/or diode D4) respectively.

It will be apparent, that the ignition circuit 50 operates as before. However, the halfwave rectifier formed by diode D3 (and/or diode D4) operates to rectify the leading negative pulse produced by the magneto and when this is of a sufficient magnitude, the ignition circuit 51 triggers as well. A second spark or shower of multiple sparks is thereby provided occuring at a time advanced from the time of ignition of ignition ciruit 50. The full circuit of FIG. 19 is illustrated in detail in FIG. 20 from which it will be appreciated that the moment of ignition of the two ignition circuits 50 and 51 can be controlled by trimming or adjusting the relative values of the resistors R2 and R3 in the two potential dividers which control the operation of their respective transistor T2.

Alternatively, if desired, both ignition circuits 50 and 51 can be identical and a small additional resistor R51 (indicated by broken lines in FIG. 20) is connected in series with ignition circuit 51 so as to prevent ignition thereof at low engine speeds in order to ensure that the ignition circuit 51 only produces its advanced spark or shower of sparks at a predetermined, relatively high, engine revolution speed.

Some internal combustion engines, and especially those having small rotors, are provided with a primary winding interior of the rotor which is not in direct magnetic association with a secondary winding. Rather, this (remote) primary winding is directly connected to an additional primary winding which forms part of a transformer having a secondary winding. FIG. 21 illustrates an embodiment of the present invention showing how the circuit of FIG. 18 is modified for this known magneto arrangement. Here the remote primary winding L1 located in the interior of the small rotor (not illustrated) is connected in series with the primary winding PW of the transformer, including the secondary winding SW. Again the diode D1 is provided as a halfwave rectifier.

It will be appreciated by those skilled in the art that for circuit of FIG. 21, prior to ignition the current flowing in the remote primary winding L1 passes directly through the ignition circuit 50 and substantially no current flows through the primary winding PW. However, at the moment of ignition, the ignition circuit 50 is nonconductive and the primary winding current is suddenly switched into the primary winding PW thereby causing a spark (or a shower of sparks).

FIG. 22 illustrates an alternative arrangement to that of FIG. 21 which requires an additional diode DS1 which is required so that a half wave rectifier is still connected in series with the primary winding PW. One advantage of the circuit of FIG. 22 is that a two terminal encapsulation of circuit 50 can be used compared with four terminals for FIG. 21.

In order to achieve a duplicate spark (or shower of sparks) with one of these sparks (or shower of sparks) being advanced whilst utilizing the magneto construction of FIG. 21, it is necessary to provide an additional remote primary winding L2 and an additional ignition circuit 51 as illustrated in FIG. 23. In FIG. 23, each of the ignition circuits 50 and 51 has a steering diode DS1 and DS3 respectively which prevent power from winding L2 being dissipated in the components of circuit 50, for example. However, for a two legged yoke, one winding L1 is on one leg and the other winding L2 is on the other leg. That is to say, FIGS. 21 and 23 are analogous to FIGS. 18 and 19.

FIG. 24 shows the circuit connection for FIG. 23 which is analogous to that of FIG. 22. Here the diodes DS1 and DS3 also ensure that the current in the primary winding PW is half wave rectified. The diodes DS2 and DS4 are alternatives to (and if desired, additional to) the diodes DS1 and DS3.

FIG. 25 illustrates a further extension of the circuit of FIG. 23 in which two additional remote primary windings L2 and L3 are provided in order to provide for three sparks or showers of sparks, each spark or shower of sparks being arranged to be provided at a different moment of ignition (dependent upon engine speed) by a corresponding ignition circuit 50, 51 and 52 each with their respective steering diodes DS, DS1 and DS2. Such an arrangement is advantageous for some engines, e.g. outboard motors, where the range of spark advance is quite large and is required in a number of steps.

FIG. 26 shows the equivalent modification to FIG. 25 in order to achieve the advantages of FIGS. 22 and 24. As indicated by the broken lines in FIGS. 21 to 26, the diodes D2, D4 and D6 and also the diodes DS2, DS4 and DS6 are additional or alternative preferences.

It will be appreciated that the arrangements of FIGS. 23 to 26 are relatively expensive since duplicate or triplicate ignition circuits 50, 51 and 52 are required. An alternative to that arrangement is illustrated in FIG. 27 which is analogous to FIG. 23 in that two remote primary windings L1 and L2 are provided. However, only a single ignition circuit 50 is provided and duplicate halfwave rectifiers D1 (and/or diode D2) and diode D3 (and/or diode D4) are provided. By the simple expedience of winding the coil of remote primary winding L2 with relatively thinner gauge wire than that used of the coil of remote primary winding PW, ignition circuit 50 can be arranged to trigger initially at low engine speed on the current flowing through L1 (which has a lower resistance) and to then trigger at high engine speeds on the current flowing through coil L2 which has the higher resistance. In this way, two sparks or showers of sparks, spaced apart in time, can be arranged as desired.

FIG. 29 is analogous to FIG. 25 and illustrates the arrangement of FIG. 27 extended for three remote primary windings L1, L2 and L3. The operation of FIG. 29 is as for FIG. 27 except that three sparks or showers of sparks are produced at three different moments of ignition. Again, if desired the gauge of wire used for each of the coils L1, L2 and L3 can be different in order to produce the desired moment of ignition. Alternatively, as indicated by dotted lines in FIG. 29, as a preferment, resistors R50 and R51 can be placed in series with coils L2 and L3 so as to ensure that these two coils respectively result in an ignition occurring at higher speeds than that produced by coil L1. Normally the resistance values of resistors R50 and R51 will be different so that the moments of ignition based upon coils L2 and L3 will occur at different engine speeds.

FIGS. 28 and 30 show the equivalent modifications to FIGS. 27 and 29 respectively in order to achieve the advantages of FIG. 22.

It is apparent that the dual ignition circuits of FIGS. 19, 20, and 23 and the triple ignition circuit of FIG. 25 have their plurality of their ignition circuits connected together in parallel. As illustrated in FIG. 31, it is also possible in accordance with the present invention to connect two ignition circuits 50 and 51 together in series across a primary winding making use of the half-wave rectifier in order to steer the correct polarity current to the correct ignition circuit.

Thus, as seen in FIG. 31, when the right hand side of primary winding PW is positive, current flows through diode D1, and thence through ignition circuit 51 in order to trigger same. Alternatively, when the left hand side of primary winding PW is positive, current flows via diode D3 and thence through ignition circuit 50 in order to trigger same. Again, if the resistance values of ignition circuits 50 and 51 are so adjusted, ignition circuit 51 can be arranged to trigger on the normal positive pulse whilst ignition circuit 50 can be arranged to trigger at an advanced time, on the rectified leading negative pulse. This principle of operation will now be explored more fully in relation to FIGS. 32 to 34.

Turning now to FIG. 32, an ignition coil 10 is provided having a primary winding PW and a secondary winding SW which is connected to a spark plug (not illustrated). Thus when the right hand side of primary winding PW as seen in FIG. 32 is positive, current flows through diode D4, from the collector to emitter of transistor T1, through diode D2 and then back to the left hand side of primary winding PW. In addition, current also flows through diode D4, through the potential divider formed by resistors R2 and R3 and thence to primary winding PW. The base current for the transistor T1 is provided by current flowing through diode D4, and thence through resistor R1.

As explained in the abovementioned U.S. Pat. No. 4,163,437, when a predetermined voltage or current level within the primary winding PW is reached, transistor T2 which is initially non-conducting commences to conduct thereby depriving transistor T1 of its base drive. In consequence, transistor T1 switches from a non-saturated conducting condition to the off condition thereby interrupting the current flowing in the primary winding PW and inducing a spark generating voltage in the secondary winding SW. However, when transistor T2 turns on, the current flowing through the resistor R2 is substantially reduced thereby starving transistor T2 of base drive and causing transistor T2 to turn off. Transistor T1 then re-commences to conduct and this cycle is repeated causing a shower of sparks so long as there is sufficient drive from primary winding PW.

It will be apparent that when the left hand side of primary winding PW is positive, then current is conducted via diode D1, again through transistor T1 and returned to primary winding PW via diode D3. Similarly current also passes through the potential divider formed by resistors R5 and R6. Thus, for this polarity, it is the transistor T3 which switches on to interrupt the flow of current through transistor T1. It will also be apparent from the above that the diodes D2 and D3 can be moved from the position illustrated in solid lines to the position illustrated by dashed lines in FIG. 32 and the operation of the circuit of FIG. 32 remains substantially the same.

It will be apparent from the foregoing that the circuit of FIG. 32 is the result of coalescing two parallel connected circuits 50, with the parallel connected main transistors T1 being replaced by a single transistor T1. Also the two parallel connected resistors R1 are replaced by a single resistor R1.

With the correct selection of the values of resistors R2 and R3 of FIG. 32, transistor T2 can be arranged to turn on thereby causing a spark (or a shower of sparks), at approximately 200 rpm for low speed engines, the spark occurs at a specific time selected to lie between approximately top dead centre (TDC) and 10° before top dead centre (BTDC). This spark is caused by the large (positive) pulse of voltage induced in the primary winding PW.

Again, with the correct selection of the values of resistors R5 and R6, it is possible to have transistor T3 turn on, thereby triggering a spark (or a shower of sparks), during the initial pulse of negative voltage which is of relatively smaller magnitude. In this way, it is possible to produce a second spark (or shower of sparks), which occurs earlier in the cycle and is therefore advanced to a selected time lying between approximately 25° to 30° BTDC.

Therefore at speeds in excess of approximately 1000 rpm, not only is the spark (or shower of sparks) advanced to between 25° and 30° BTDC, but a second spark (or shower of sparks) is also produced between 10° and approximately 0° BTDC thereby giving a prolonged burn time and enhancing the combustion process.

FIG. 33 illustrates a modified form of the circuit arrangement of FIG. 32 in which the single transistor T1 has been replaced by two transistors T1 and T4 which have their collectors connected together. The dual role provided by resistor R1 of FIG. 1 is provided by two resistors R1 and R4 in FIG. 33, otherwise the arrangement of the potential dividers and transistors T2 and T3 remains the same. Two diodes D1 and D4 are provided with each being connected between the collector and emitter of the corresponding one of the transistors T1 and T4, but with reverse polarity.

Thus, in operation, when the right hand side of primary winding PW is positive, current is conducted via diode D4 through the transistor T1 and also through the potentiometer formed by resistors R2 and R3 leading eventually to a triggering of transistor T2 which interrupts the current flowing through transistor T1. On the other hand, when the left hand side of primary winding PW is positive, then current is conducted via diode D1 and through transistor T4. Current also passes through diode D1 and the potentiometer formed by resistors R5 and R6 to eventually trigger transistor T3 and thereby interrupt the current flowing through transistor T4.

Turning now to FIG. 34, an alternative arrangement to that illustrated in FIG. 33 is provided, which operates in a substantially equivalent manner. Thus when the right hand side of the primary winding PW of FIG. 34 is positive, current is conducted via transistor T4 and the potentiometer formed by resistors R5 and R6 and thence through diode D1 to the left hand side of the primary winding PW. When the voltage across resistor R6 is sufficient, transistor T3 is turned on, thereby interrupting the flow of current in transistor T4.

During the reverse polarity situation, current flows from the positive left hand side of the primary winding PW through the transistor T1 and thence through the diode D4. The time at which transistors T1 and T4 are first switched off is controlled by adjusting the value of resistors R2 and R5 respectively.

Because of the large current load carried by transistors T1 and T4, of FIGS. 32 to 34, it is desirable that these transistors be Darlington transistors as illustrated in FIG. 35. Currently commercially available integrated Darlington transistors include a diode connected from collector to emitter but with reverse polarity as indicated in FIG. 35. Such a commercially available device can be substituted for the diode D4 and transistor T4 as indicated by the three connections A, B, C in FIGS. 34 and 35. An equivalent substitution is also available for the transistor T1 and diode D1 of FIG. 34 and the transistors T1 and T4 and diodes D1 and D4 of FIG. 33.

Further, as illustrated by dashed lines in FIG. 33, diodes D1 and D4 can either be omitted or retained and one or both of diodes D10 and D11 inserted and one or both of diodes D12 and D13 inserted. The diodes D10–D13 are illustrated by broken lines and can be used to steer the current flow from the primary winding PW to the correct transistors T1 or T4 respectively.

A practical advantage of the circuit of FIGS. 33 and 34 is that each of the transistor, and resistor and diode combinations duplicates the basic ignition circuit referred to in the abovementioned U.S. Pat. No. 4,163,437. Since this circuit has now been fabricated in a low cost circuit module, in order to realize the circuit of FIG. 33 it is only necessary to connect two of these circuit modules together back-to-back in the manner indicated. Similarly, the circuits disclosed in U.S. Pat. No. 3,878,452 and other prior art circuits can likewise be connected in accordance with the present invention to achieve substantially the same result of dual sparks.

FIG. 36 illustrates a modification to the circuit of FIG. 5 which enables an electronic governor to be provided which limits the maximum speed at which an engine can operate. This is achieved by the provision of an addition transistor T3 which is connected between the resistor R1 and the collector of transistor T2 (this point being in common with the base of transistor T1). The base of transistor T3 is connected to the mid-point of a further potential divider formed by resistors R7 and R8. A capacitor C3 is connected to one end of the primary winding PW and to the mid-point of the potential divider formed by resistor R7 and R8, either directly, or via a further optional resistor R3 as indicated by dotted lines in FIG. 36.

It will be apparent that where transistor T3 conducts, the operation of the circuit of FIG. 36 will be substantially the same as the operation of the circuit of FIG. 5 in that base current will be provided for the transistor T1 and a conduction path is available for the transistor T2 in order to cause transistor T1 to turn off. This can be arranged to be the normal state of affairs by ensuring that the resistance value of resistor R7 is relatively low compared to the resistance value of resistor R5 but that the total value of resistances R7 and R8 are at least of the same order of magnitude as the total value of the resistance of resistors R5 and R6.

That is, resistor R7 is sufficiently low to ensure that there is base drive for transistor T3 which therefore enables transistor T3 to conduct the base current required for transistor T1 to conduct current. At the moment of ignition, transistor T2 conducts thereby diverting the base current for transistor T1 and causing same to switch off.

However, during each negative pulse produced by the primary winding PW, the capacitor C3 is charged via resistor R7 (and resistor R3 if present) so as to be negatively charged. The effect of this is to divert some of the current flowing initially through resistor R7 away from the base of transistor T3 into charging capacitor C3. Thus transistor T3 is only able to conduct current at a slightly later time. This is of no consequence at low engine speed since the magnitude of the leading negative pulse of voltage induced in the primary winding PW is very much less than the magnitude than the positive induced pulse. Thus, although there may be a slight delay before transistor T3 conducts, transistor T3 conducts in ample time to allow transistor T1 to conduct prior to the time of ignition.

However, at very high rpm's, the magnitude of the negative induced voltage pulse is now comparable with, although still less than, the magnitude of the induced positive pulse. Thus during this induced leading negative pulse, the capacitor C3 received a substantial negative charge. In consequence, there is insufficient time during the period of the positive pulse (which is now of relatively short duration because of the high engine speed), to positively charge the capacitor C3 via resistor R7 (and resistor R3 if present) to a degree sufficient to cause transistor T3 to conduct. Thus transistor T3 does not conduct during the positive induced voltage. As a result, there is no base drive for the transistor T1, and thus there is no spark. Typical magitudes for the resistance values for the circuit of FIG. 36 are as follows: R1, 1.2 KOhm; R5, 4 KOhm; R6, 1 KOhm; R7, 750 Ohm; R8, 5.5 KOhm.

It will be appreciated that the portion of the circuit of FIG. 36 within the box designated 60 can be used to provide the ignition circuit 50, 51, 52 of FIGS. 19 and 21 to 31 provided that the appropriate connection is made between the primary winding PW and the junction of resistors R7 and R8 in the form of capacitor C3 (possibly with resistor R3 connected in series). It follows from the above that the function of governing for engine speeds can be achieved together with the advantages of reduced retardation at the time of ignition with increasing engine revolutions, and an additional advanced spark at high engine speeds.

FIG. 37 illustrates the use of two governor circuits 60 and 61 in order to achieve a governing action with the advantage of a stepped adjustment for the time of ignition of one of the ignition circuits. Normally resistor R51 is provided to delay the operation of circuit 61 until moderate engine speeds are achieved. The timing of circuit 61 is normally advanced. Both circuits 60 and 61 are rendered inoperative at high engine speeds.

FIG. 38 illustrates the detail of the application of the governor circuit of FIG. 36 to the circuit of FIG. 31. The dual capacitors C3 and C13 are respectively connected between opposite ends of the primary winding PW and the junction of the corresponding potential dividers formed by resistors R7/R8 and R17/R18. The operation of the circuit of FIG. 38 is the polarity dual of the operation of the circuit of FIG. 36 in the same way that the operation of FIG. 31 is the polarity dual of the operation of FIG. 5. Thus the initial spark (or shower of sparks) and the second advanced spark (or shower of sparks) are both extinguished by turning transistors T3 and T13 off at speeds above the governed engine speed.

The governor circuits of FIGS. 36, 37 and 38 suffer from the disadvantage that the engine creates a banging noise when the governor comes into operation. It is thought that this noise arises because the explosive mixture of one (unignited) compression stroke is ejected into the exhaust muffler and (because the engine slows due to loss of power from the unignited stroke) the next ignited compression stroke when exhausted ignites this explosive mixture in the muffler. For many applications, such as compacting or pneumatic tools which are inherently noisy, this does not represent a disadvantage.

However this problem of irregular running noise can be overcome by the magnetic yoke arrangement of FIG. 39 and either of the circuits of FIGS. 40 or 41. In this case the yoke 15 is provided with three legs 16, 17 and 18. The leading leg 16 carries only a single primary winding PW2 whilst the trailing leg 18 carries both a primary winding PW1 and a secondary winding SW. The centre leg 17 carries no windings. The air gap between both the leading leg 16 and the centre leg 17 and the rotor 10 is small and of conventional size. However the air gap between the trailing leg 18 and the rotor 10 is larger than the gap between the rotor 10 and leading leg 16.

In addition, the timing of the magnets carried by the rotor 10 and the yoke 15 is such that ignition due to the flux change in leading leg 16 occurs before top dead centre (e.g. 20°–30° BTDC depending on engine design) whilst ignition due to the flux change in trailing leg 18 occurs substantially after top dead centre (e.g. approximately 30° ATDC depending on engine design). Because of the increased reluctance of the magnetic circuit including trailing leg 18, ignition with this leg only occurs at high engine speeds.

Thus the operation of the circuits of FIGS. 40 and 41 is as follows. At low engine speeds the change of flux through primary winding PW2 is sufficient for that primary winding to operate the ignition circuit 60 without governing. Well before the speed at which governing takes place, the change of flux in trailing leg 18 is now sufficient for primary winding PW1 to operate ignition circuit 60 normally at approximately 30° ATDC without governing (because of the reduced induced primary winding voltage in winding PW1).

If the charge has previously been ignited via winding PW2, the additional spark (or shower of sparks) is of no consequence. However, if governing has commenced (ie. no ignition caused by primary winding PW2), the late ignition caused by primary winding PW1 results in a firing of the explosive mixture but with little power. Thus the engine slows to a governed speed but there is no exhaust noise as if the engine were "missing" or misfiring. Thus smooth and quiet governing is achieved.

Substantially the same result can be achieved with the primary winding PW2 located on the trailing leg 18 and the primary winding PW1 with the secondary winding SW located on leading leg 16. Alternatively, the primary windings PW1 and PW2 can be located as remote primary windings on either of the trailing or leading legs and connected to a primary and secondary winding in the manner illustrated in FIGS. 23, 24, 27 and 28. Furthermore, two circuits (e.g. 50 and 60 or 60 and 61) of similar configuration can be connected as illustrated in FIGS. 19 and 38 to achieve two moments of ignition spaced apart in time.

In FIG. 42, a further embodiment of a stepped advance ignition circuit is illustrated. The secondary winding SW and ignition circuit proper (R1,R2,R3,T1 and T2) are as before e.g. FIG. 5.

However, a pair of primary windings PW1 and PW2 are provided. These can be located the yoke 15 of FIG.

39 (for example) in two ways. In the first way the primary windings PW1 and PW2 are wound on separate legs (e.g. 16 and 18 of FIG. 39) of the yoke 15. This is indicated by the dotted or broken line portion of the parallel lines in FIG. 42 indicating the magnetic circuit. In this arrangement the primary windings PW1 and PW2 are wound with the same sense or in the same direction.

In the second way both primary windings are located on the same leg (which could be any of legs 16,17 or 18). In this case the primary windings PW1 and PW2 are wound in opposing directions. This second way has the advantage that all windings SW, PW1 and PW2 (and even all the other components of the circuit) can be encapsulated in a single unit.

A pair of steering diodes D421 and D422 are used to direct or steer the output of primary windings PW1 and PW2 to the remainder of the circuit as required. If desired, a further pair of diodes D423 and D424 can also be provided. These diodes are not essential as indicated by broken lines.

The operation of the circuit is as follows. Primary winding PW1 is substantially conventional and is arranged to trigger at a low starting speed and at or about top dead centre. Thus ignition commences and continues at all speeds on the first primary winding PW1.

The second primary winding PW2 is arranged with thinner wire than that used for winding PW1. Alternatively, the same gauge wire could be used and a small resistor included in series as indicated in FIGS. 29 and 30.

The second primary winding PW2 is preferably arranged to trigger at approximately 25° BTDC, and normally within the range 20°-30° BTDC or as required by a given engine design.

Because of the thinner wire (or resistance) the second primary winding does not produce its ignition spark until the engine speed has increased.

The circuit of FIG. 42 has a substantial cost advantage over the circuit of FIG. 19, for example, since the advanced spark is produced by an extra coil rather than an extra group of circuit components.

Turning now to FIG. 43, this circuit is substantially the same as that of FIG. 42 save that a further coil L43 is provided connected to the base of transistor T43 via an optional resistor R43. The coil L43 is small and is wound in the same direction as primary winding PW2 if on the same leg, as is normally the case.

The circuit of FIG. 43 achieves its governing action in the following way. At a predetermined high engine speed the energy induced in coil L43 is sufficient to cause the transistor T43 to conduct or even saturate, thereby holding or preventing transistor T2 from conducting. In consequence transistor T1 is not interrupted and there is no advanced spark.

However, there is a delayed spark produced via primary winding PW1 so there is no banging noise associated with the governing action.

The circuit of FIG. 43 can be used to achieve governing only. This can be arranged by having primary winding PW2 arranged to fire at low speeds at approximately 20°-25° BTDC. The primary winding PW1 can now have higher resistance or thinner wire or otherwise be arranged to fire at high speed and at approximately 10-40 BTDC. Thus as the spark from primary winding PW2 is extinguished via transistor T43 the spark at 10°-40° BTDC from primary winding PW1 runs, and governs, the engine because there is little power produced by the engine with this delayed spark. This arrangement is particularly suitable for slower reving engines with a large moving mass.

It will be apparent that the coil L43 can be connected to the other side of diode D424 since the base emitter junction of transistor T43 provides a rectifying action.

The foregoing describes only some embodiments of the present invention and modifications, obvious to those skilled in the art, can be made thereto without departing from the scope of the present invention.

What we claim is:

1. A transistor ignition circuit for providing an advanced spark at high engine speeds, said circuit comprising a substantially conventional transistor switching circuit and a plurality of primary windings connected to said switching circuit via at least one half wave rectifier, only one of said primary windings having a first resistance associated therewith being arranged to operate said switching circuit at starting engine speeds, and another one of said primary windings having a second resistance associated therewith being arranged to operate said switching circuit at said high engine speeds, said second resistance being higher than said first resistance.

2. A circuit as claimed in claim 1 wherein said another primary winding has a resistance connected in series therewith.

3. A circuit as claimed in claim 2 wherein a further switching component is provided in said switching circuit and arranged to disable same, and a further coil is connected to any one of said primary windings and to said further switching element to activate same.

4. A circuit as claimed in claim 3 wherein said further coil is connected to said another primary winding whereby said advanced spark is disabled by said further coil and further switching component.

5. A circuit as claimed in claim 1 wherein the wire with which said another primary winding is wound is thinner than the wire with which said one primary winding is wound.

6. A circuit as claimed in claim 5 wherein a further switching component is provided in said switching circuit and arranged to disable same, and a further coil is connected to any one of said primary windings and to said further switching element to activate same.

7. A circuit as claimed in claim 1 wherein said half wave rectifier comprises a single diode connected in series with each said primary winding.

8. A circuit as claimed in claim 7 wherein a further diode is connected in series with each said primary winding, said single diode and said further diode being like poled and being separated by said primary winding.

9. A circuit as claimed in claim 7 wherein a further switching component is provided in said switching circuit and arranged to disable same, and a further coil is connected to any one of said primary windings and to said further switching element to activate same.

10. A modification to the ignition circuit as claimed in claim 1 wherein at least one of said primary windings is a remote primary winding.

11. A circuit as claimed in claim 10 wherein all but one of said primary windings are remote primary windings.

12. A circuit as claimed in claim 1 wherein a

* * * * *

UNITED STATES PATENT AND TRADEMARK OFFICE
CERTIFICATE OF CORRECTION

PATENT NO. : 4,911,126

DATED : March 27, 1990

INVENTOR(S) : Notaras, et al

It is certified that error appears in the above-identified patent and that said Letters Patent is hereby corrected as shown below:

The sheets of drawings consisting of Figs. 4,5,17,18,19 and 20, should be added as shown on the attached pages.

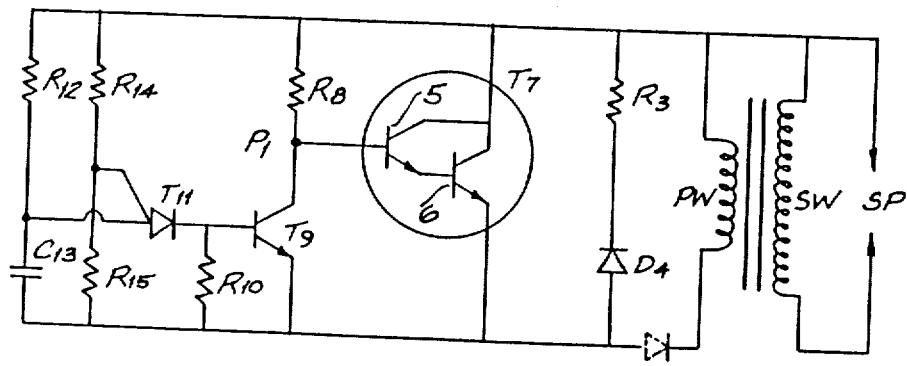
PRIOR ART  FIG. 4
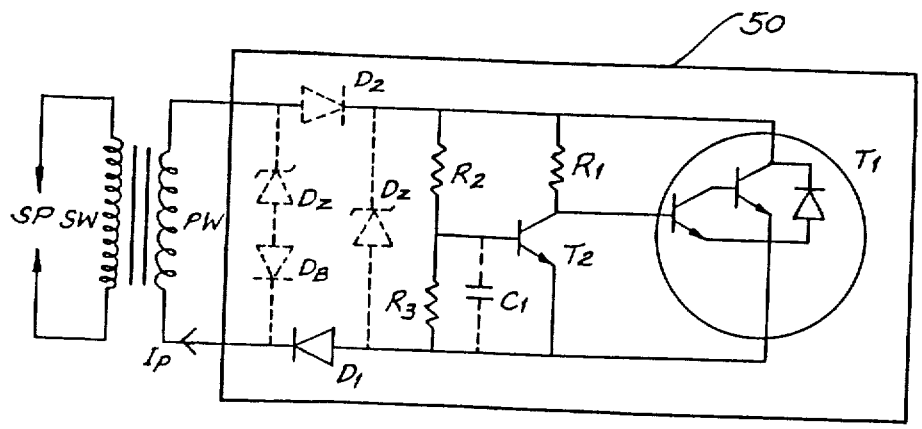
FIG. 5

UNITED STATES PATENT AND TRADEMARK OFFICE
CERTIFICATE OF CORRECTION

PATENT NO. : 4,911,126

DATED : March 27, 1990

INVENTOR(S) : Notaras, et al

It is certified that error appears in the above-identified patent and that said Letters Patent is hereby corrected as shown below:

Column 22, line 65, claim 12 should read as follows:

--12. A Circuit as claimed in claim 1 wherein a further switching component is provided in said switching circuit and arranged to disable same, and a further coil is connected to any one of said primary windings and to said further switching element to activate same.--

Signed and Sealed this

Nineteenth Day of January, 1993

Attest:

DOUGLAS B. COMER

*Attesting Officer*     Acting Commissioner of Patents and Trademarks